United States Patent
Rohr et al.

(10) Patent No.: US 8,874,620 B1
(45) Date of Patent: Oct. 28, 2014

(54) DATA TRANSFER OPTIMIZATION

(75) Inventors: Vincent M. Rohr, Woodinville, WA (US); Brandon A. Cook, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 441 days.

(21) Appl. No.: 13/161,385

(22) Filed: Jun. 15, 2011

(51) Int. Cl.
*G06F 17/30* (2006.01)

(52) U.S. Cl.
USPC .......................................... 707/803; 707/809

(58) Field of Classification Search
CPC .......... G06F 17/30597; G06F 17/3056; G06F 17/3043; G06F 17/30286; G06F 17/30292; G06F 17/30592; G06F 17/30315; G06F 17/30327; G06F 17/30398; G06F 17/30424; G06F 17/30575; G06F 17/30578; G06F 17/3087; G06F 17/3089; G06F 17/30893; G06F 17/211; G06F 17/248; G06F 17/24
USPC ................................................. 707/803, 809
See application file for complete search history.

(56) References Cited

U.S. PATENT DOCUMENTS

| 4,961,134 A * | 10/1990 | Crus et al. ............................ 1/1 |
| 5,412,804 A | 5/1995 | Krishna |
| 2002/0091748 A1 | 7/2002 | Rehg et al. |
| 2005/0131917 A1* | 6/2005 | Auerbach ..................... 707/100 |
| 2005/0144026 A1 | 6/2005 | Bennett et al. |
| 2005/0223109 A1 | 10/2005 | Mamou et al. |
| 2006/0022048 A1* | 2/2006 | Johnson ..................... 235/462.1 |
| 2007/0011437 A1 | 1/2007 | Carnahan |
| 2012/0278282 A1* | 11/2012 | Lu et al. ........................ 707/634 |

OTHER PUBLICATIONS

Office Action for U.S. Appl. No. 13/161,352, mailed on May 23, 2014, Vincent M. Rohr, "Data Streaming Optimization", 20 pages.

* cited by examiner

*Primary Examiner* — Apu Mofiz
*Assistant Examiner* — Fariborz Khoshnoodi
(74) *Attorney, Agent, or Firm* — Lee & Hayes, PLLC

(57) ABSTRACT

A dataset structure that is suitable for transferring data between service components may include a table having one or more rows and a plurality of columns. The table may be defined by a schema for an entity type. The schema may include a corresponding column definition for each column. Each of the rows may store a tuple of information that conforms to the entity type defined by the schema. A data transfer component may use the dataset structure to transfer data between the service components.

28 Claims, 15 Drawing Sheets

DATA TRANSFER OPTIMIZATION

BACKGROUND

The manipulation of data in an efficient and predictable manner is a desired operational goal of applications that include service oriented architectures (SOAs). SOAs may include both interactive and background components that perform many different computing services. For example, an e-commerce application that serves millions of customers may include many thousands of servers located in numerous data center across the world. Such servers may be running hundreds of computing services that facilitate product recommendations, product ordering, product fulfillment, transaction processing, fraud detection, product shipping, and so forth. The SOAs are designed to manipulate data in an efficient and predictable manner, which is important when transferring data between different computing services.

When the computing services are used to fulfill a customer's order, data may be serialized, transmitted, and then deserialized across many different computing services, which may occur multiple times. Serialization is a transformation of a data structure or a data object into data bytes of a different format for transmission across a network and/or storage in a storage node. Deserialization is the extraction of a data structure and data objects from the series of data bytes. However, the serialization, transfer, and deserialization of data across multiple services may result in latency and bottlenecks. Further, the transfer of data may be inefficient as each computing service often only consumes or produces a small portion of the data.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to a data transfer component that implements a light weight in-memory dataset structure that may facilitate the transfer of data between services. The data transfer component may be a library that is accessible to one or more applications that desire to transfer data between the services. In some embodiments, the data transfer component may be implemented in conjunction with a data transfer middleware framework. The data transfer middleware framework may connect the applications to one or more data stores that are implemented in a cloud computing environment. The one or more applications may include an application that stores and retrieves data, such as a web-based commerce application, an online banking application, an inventory tracking application, and/or any other type of application. The data stores may store the data for the one or more applications and provide the data to each application after a corresponding application request.

In various embodiments, a dataset structure that is suitable for transferring data between service components may include a table having one or more rows and a plurality of columns. The table may be defined by a schema for an entity type. The schema may include a corresponding column definition for each column. Each of the rows may store a tuple of information that conforms to the entity type defined by the schema. A data transfer component may use the dataset structure to transfer data between the service components.

Further, a variable row size table or a fixed row size table may be implemented as the type of table in the dataset structure. Accordingly, the selection of a type of table for implementation may include testing each of a variable row size table or a fixed row size table for an ability to support the transfer of data between a sending service component and a receiving service component. Depending on the results of the testing, data may be stored using one of the variable row size table or the fixed row size table that supports the fastest data transfer between the sending service component and the receiving service components.

The techniques and systems described herein may be implemented in a number of ways. Example implementations are provided below with reference to the following figures.

Illustrative System Architecture

Figure 1:
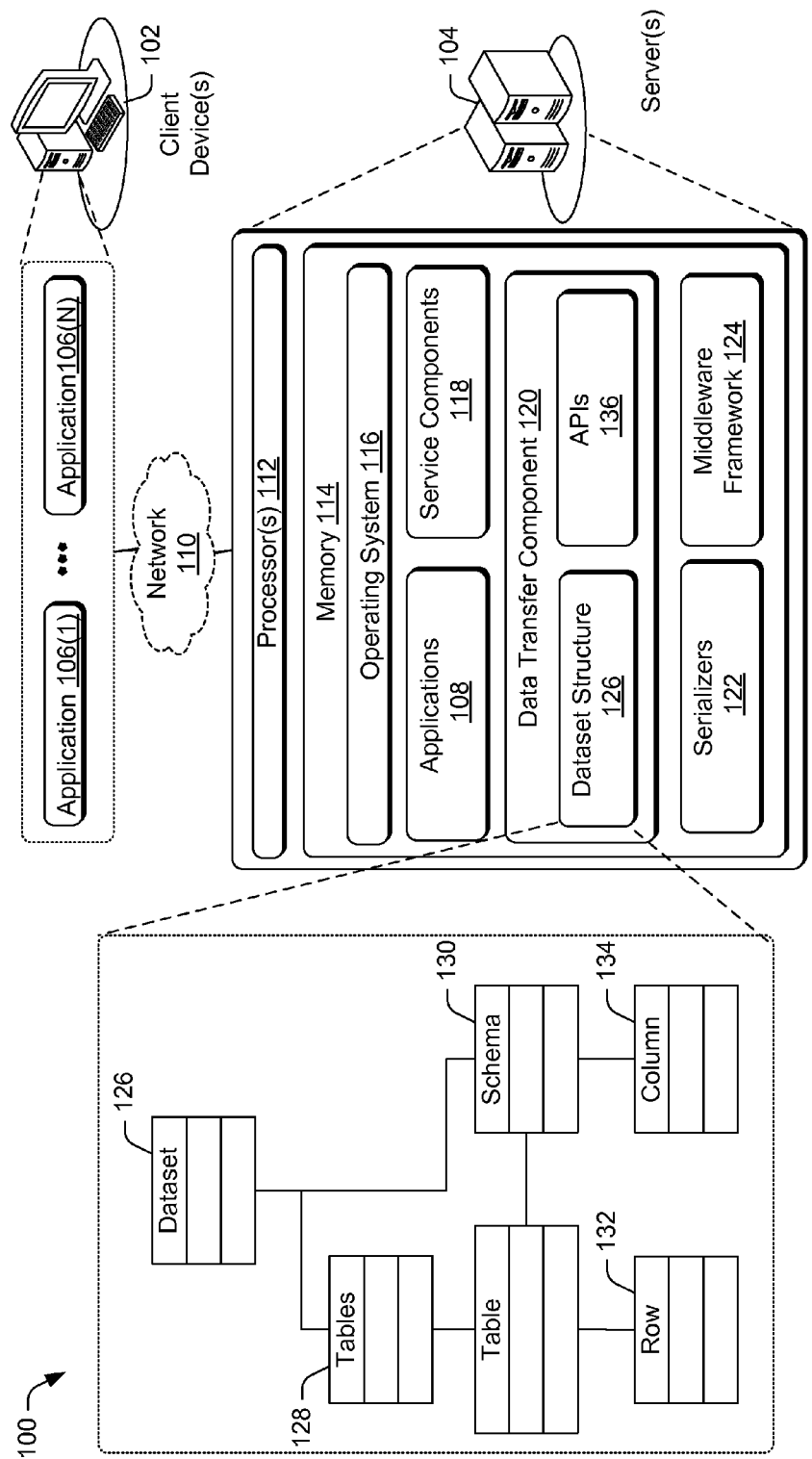
FIG. 1 is an illustrative data access environment for implementing a data transfer component that uses a light weight in-memory dataset structure to transfer data between service components.

FIG. 1 is an illustrative data access environment 100 for implementing a data transfer component that uses a light weight in-memory dataset structure to transfer data between service components. The environment 100 may include client device(s) 102 and server(s) 104. The servers 104 may be located at a single data center, or across multiple data centers.

Each of the client devices 102 may be an electronic device that is capable of receiving, processing and transmitting data to another device. In various embodiments, each of the client devices 102 may be any one of a laptop computer, a desktop computer, a server, or another electronic device that is equipped with network communication components, data processing components, and at least one electronic display for displaying data. The client devices 102 may include one or more applications 106(1)-106(N) that transact data to the servers 104 via a network 110. For example, the application 106(1)-106(N) may include a web browser that sends data to and receives data from one or more applications 108 that are executing on the servers 104. The network 110 may be a local area network (LAN), a larger network such as a wide area network (WAN), or a collection of networks, such as the Internet. Protocols for network communication, such as TCP/IP, may be used to implement the network 110. Although embodiments are described herein as using a network such as the Internet, other distribution techniques may be implemented.

The servers 104 may include processor(s) 112 and a memory 114. An operating system 116 may be stored in the memory 114. The operating system 116 may include components that enable the servers 104 to receive data via various inputs (e.g., user controls, network interfaces, and/or memory devices) and process the data using the processors 112 to generate output. The operating system 116 may further include one or more components that present the output (e.g., display an image on an electronic display, store data in memory, transmit data to another electronic device, etc.). Additionally, the operating system 116 may include other components that perform various other functions generally associated with an operating system.

The processors 112 and memory 114 may implement the applications 108, service components 118, a data transfer component 120, one or more serializers 122, and a middleware framework 124. The processors 112 may also access data store(s) that are implemented in the memory 114. Each of the applications 108 may receive data from the applications 106(1)-106(N), process the data, and send process data back to the application 106(1)-106(N). For example, in the context of e-commerce, the applications 108 may include a web transaction application that receives and fulfills online purchase requests from users, an online banking application that provide users with web access to financial information, a corporate inventory application that keeps track of inventory in real time, and/or the like.

The one or more service component 118 may be components that are called upon by the applications 108 to perform particular tasks. For example, in the context of e-commerce, the services components 118 may include a component that provides product recommendations, a component that processes product orders, a component that calculates a payment, a component that detects fraud, a components that processes shipments, and the like.

The data transfer component 120 may transfer data between the service components 118, the applications 108, as well as between other entities. The transaction of data between the applications 108 and the data stores may be facilitated by the middleware framework 124. For instance, the middleware framework 124 may serve to transform a data store request from the applications 108 into multiple data writes to the multiple data stores. Similarly, in another instances, the middleware framework 124 may serve to transform a data retrieval request from the applications 108 into multiple data reads from the multiple data stores in the middleware framework 124. However, in both of these instances, the goal of the middleware framework 124 is to handle the store requests and/or retrieval requests seamlessly for the applications 108, regardless of the data store architecture of the data stores. Accordingly, the data transfer component 120 may work in conjunction with the middleware framework 124. For example, the data transfer component 120 may call the middleware frame 124 to store to the data stores and/or retrieve data from the data stores.

In some instances, the data stores may have some usage constraints. For example, there may be a limit on the sizes of atomic data collections that are stored in the data stores so that a certain level of data access performance may be maintained. In another example, the data stores may use the principle of eventual consistency to store and retrieve data. Accordingly, data that may have been recently stored in the data stores may be unavailable for immediate retrieval as the data may need to proliferate to the different data stores to maintain eventual consistency.

The data transfer component 120 may use a light weight in-memory dataset structure 126 that resembles a database to manage the data that is transferred between the service components 118, the applications 108, and/or the data stores. As shown, the dataset structure 126 may include a collection of tables 128, in which each table is associated with one of a collection of table types, also known as a schema, such as schema 130. The tables 128 may further include one or more rows, such as the row 132, as well as one or more columns, such as the column 134. The data transfer component 120 may include a plurality of application programming interfaces (APIs) 136 that interact with the dataset structure 126. In various embodiments, the APIs may be similar in nature to those used for interacting with databases. The APIs 136 may include APIs for, but are not limited to, APIs for schema creation, APIs for data modeling, APIs for create, read, update and/or delete (CRUD) data with respect to the dataset structure 126, and/or APIs to one or more serializers 122 that perform serialization/deserialization. An example set of application programming interfaces (API) for interacting with the overall dataset structure 126 is illustrated in Table I.

TABLE I

Example APIs for Interaction with a Dataset

| Class | APIs | Description |
|---|---|---|
| Dataset | setTables<br>getTables<br>addTable<br>getTable<br>deleteTable<br>size<br>addTableType<br>getTableType<br>getTableTypes<br>deleteTableType<br>getTablesByType<br>isDirty<br>setClean<br>iterator | A collection of tables and schemas |

The tables 128 may be a dataset structure class that includes one or more tables. However, the tables 128 may be empty and contain no data in some instances. Each table may stand alone, which may make it easy to create a set of temporary tables 128 that are not part of the dataset structure 126. Additionally, the table's class may serve as a convenient way to iterate over all the tables 128 in a database set. Each of the tables 128 is associated with a schema, such as one of the schemas 130.

A row of data, such as the row 132, may represent a tuple of information that is of the type defined in a schema, such as the schema 130. In other words, a row is a logical construct. When a row of data is added to a table, the data may be added as a collection of objects. Accordingly, when a row of data is extracted from a table, the data is extracted as a row from the table.

In various embodiments, a row of data may be related to one or more other rows of data in a relational database manner. Accordingly, the data transfer component 120 may manage such relationships using a custom code. For example, queries may be written in code rather than relying on a pre-established query language. Further, the data transfer component 120 may use custom code to perform constraint checking rather than rely on the use of the pre-established query language or pre-defined constraints for values in a particular row. In this way, the use of custom codes may free the dataset structure 126 from the operation limitations imposed by pre-established query languages.

A column definition for a column, such as the column 134, may define the column as containing the names of attributes, types of attributes, or whether each attribute is a piece of identifying information (e.g., primary key). An example set of APIs for interacting with the tables 128 is illustration in Table II.

TABLE II

Example APIs for interacting with Tables

| Class | APIs | Description |
| --- | --- | --- |
| Tables | addTable<br>getTable<br>deleteTable<br>getTables<br>size<br>isDirty<br>setClean<br>iterator | Manages a collection of tables. |
| Table | getSchema<br>getTypeName<br>addColumn<br>addRow<br>getRow<br>getRowByKey<br>deleteRowId<br>deleteRowByKey<br>deleteUsingBinaryRow<br>updateRow<br>length<br>isDirty<br>setClean<br>iterator | Manages rows of data. |
| Column | getName<br>getType<br>isFixedLength<br>isPrimaryKey | Manages columns of data. |

Each of the schemas 130 may contain a collection of column definitions. The entirety of the schema defines a type. Accordingly, a plurality of tables 128 that share the same schema may be of the same type. A schema may be modified so long as there is no data in the dataset structure 126 that is using the schema. Conversely, once a piece of data is using the schema, then the schema may not be modified. A schema may be created in several ways. For instance, the schema may be directly shared across multiple tables of the tables 128 as a table type. In another instance, the schema may be implemented directly on a table, such as one of the tables 128. An example set of APIs for interacting with one or more schemas is illustrated below in Table III.

TABLE III

Example APIs for Interacting with Schemas

| Class | APIs | Description |
| --- | --- | --- |
| TableSchema | add<br>getColumnCount<br>getPkColumnCount<br>getColumns<br>getIndexBlockSize<br>isDirty<br>setClean<br>isValid<br>getColumn<br>isColumnPrimaryKey<br>isFixedLength<br>getFixedSize<br>getFixedSchema<br>hasPrimaryKey<br>inUse<br>getOverHeadColumnCount | A collection of columns that define what a row (tuple) of data looks like |

In various embodiments, the data transfer component 120 may use data types that consist of both reference types and value types. A reference type may be a value that is referenced with some form of pointer, while a value type is something that exists with a specific scope. Accordingly, reference types may reference non-existing values, such as when a reference is null. On the other hand, value types generally exist within their scope and are associated with values. The example types of data that are supported by the data transfer component 120 are illustrated below in Table IV.

TABLE IV

Example Data types Supported by the Data transfer component for a Dataset

| Type | Bytes | Description |
| --- | --- | --- |
| Boolean | 1 | True or False |
| Byte | 1 | Single byte integer |
| Short | 2 | Two byte integer |
| Int | 4 | Four byte integer |
| Long | 8 | Eight byte integer |
| Float | 4 | Four byte floating point number |
| Double | 8 | Eight byte floating point number |
| Uuid | 16 | Universally unique identifier |
| DateTime | 8 | Date and time |
| String | 2 + size | String data in UTF8 encoding |
| ByteArray | 2 + size | Binary data |
| Decimal | 2 + size | Accurate numbers, no rounding errors (as is needed for financial transactions) |

It will be appreciated that data of the variable length data type, such as String, ByteArray, and Decimal, may be set to a length of zero. However, such a length is not equivalent to null. Further, other data types, such as integers that may be 1, 2, 3, or 4 bytes in length, may be implemented by the data transfer component 120 in other embodiments.

The data transfer component 120 may use the one or more serializers 122 to convert data into different formats as the data is transferred between different service components. Such formats may include a custom binary format, Extensible Markup Language (XML) format, JavaScript Object Notation (JSON), and the like.

In various embodiments, in order to transfer data from a sending service component to a receiving service component, a serializer associated with the sending service component may perform one or more data conversions to serialize at least a portion of the formatted data into data bytes that are capable of being transmitted over a network to the receiving service component. The receiving service component may perform one or more data conversions to deserialize the received byte data and reconstitute the data into the original format or a new format for additional processing. Such serialization and deserialization may occur multiple times as an application 108 uses various service components 118 to process data, as the data may be sequentially passed through the service components 118 during the data processing.

For example, the serializers 122 may include a custom binary formatter. In various embodiments, the custom binary formatter may perform two type of serialization: full serialization and differential serialization. In such cases, the initial information produced by the custom binary formatter may include four bytes of data. The first two bytes of the data may be the characters "d" and "s". The first two bytes may be followed by two single unsigned byte integers that represent the major version and minor version numbers. For instance, for version "1.0", the bytes may be "0100".

Additionally, the custom binary formatter may serialize the data in a dataset, such as the dataset structure 126, according to dataset, tables, or each table. In the serialized data, each of these may be signified with a different value. For example, a dataset may be signified by "1", tables may be signified by "2", and each table may be signified by "3". Thus, if the serialized data starts off with "d, s, 1, 0, 1", then the serialized data may be a serialized dataset that is serialized using a 1.0 version of the custom binary formatter. Further, all data that is variable in size, such as strings, arrays, and lists, may be preceded with a corresponding size designation. For instance, an array of six items may be preceded with six in the serialized data.

During a full serialization, the custom binary formatter may visit each class in the dataset structure to generate a complete copy of all the data in serialized form. Differential serialization is similar to full serialization, except that only pages of data that are marked as "dirty" are serialized. Thus, during transfer of data between a source service and a destination service using differential serialization, the data transfer component 120 may merge serialized "dirty data" from a source service with an unchanged data portion that is already present in a destination service to reconstitute the copy of the data at the destination service.

Figure 2:
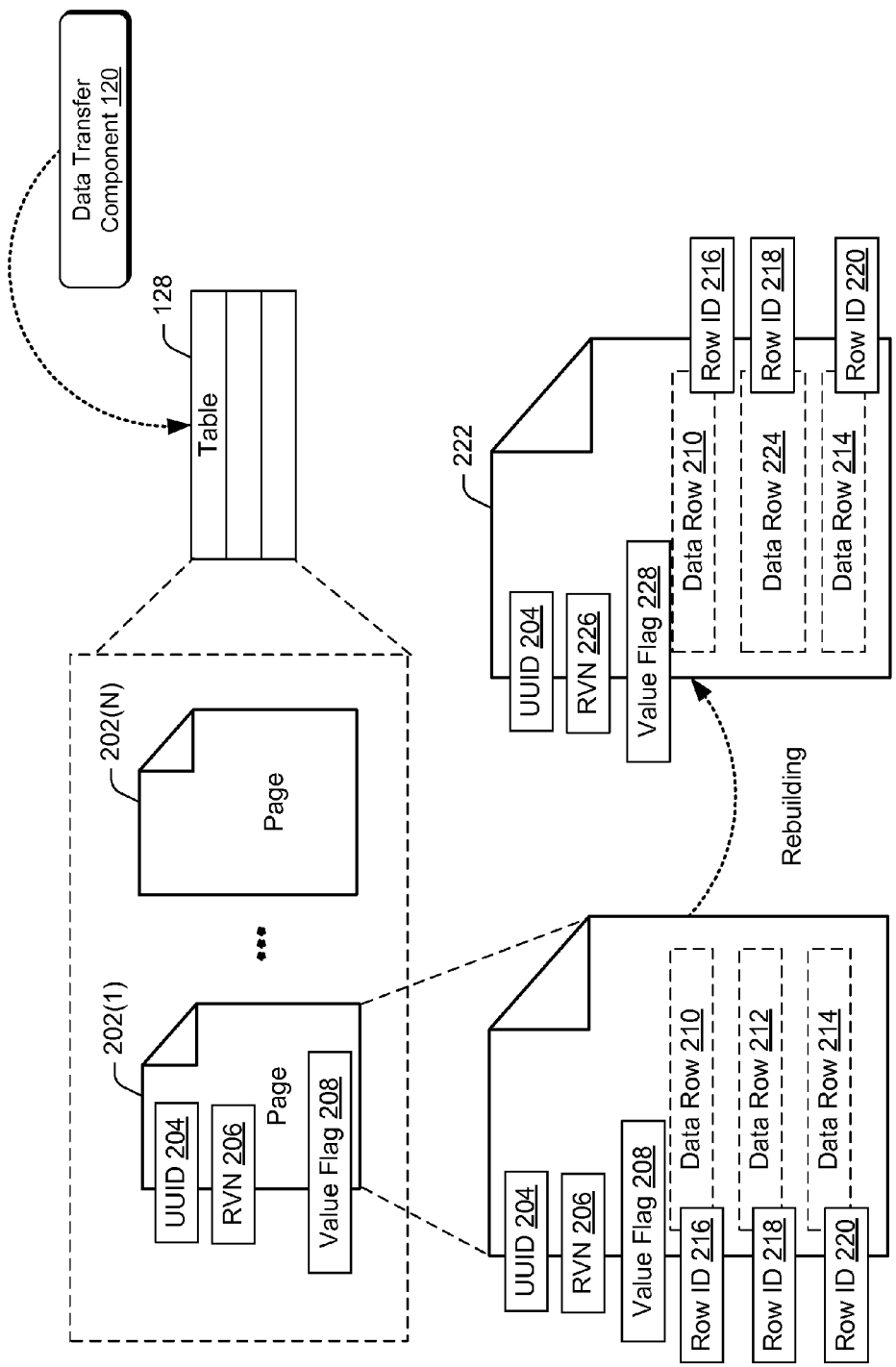
FIG. 2 is an illustrative block diagram that shows a plurality of pages that store the data in tables of the dataset structure.

FIG. 2 is an illustrative block diagram that shows the storage of data in a dataset as a plurality of pages. In various embodiments, the data transfer component 120 may store the data in a table, such one of the tables 128, as a linked list of pages 202(1)-202(N), rather than as a single large byte array. The pages 202(1)-202(N) may be further stored in one or more of the data stores.

When a page, such as the page 202(1), is created, the data transfer component 120 may provide the page with a predetermined size. Subsequently, data may be added to a page until the size is reached. Once this occurs, the data transfer component 120 may mark the page as full so that no additional rows of data are added to the page. The data transfer component 120 may then start and populate a new page in the same manner. In this way, the data transfer component 120 may achieve minimal unused space, i.e., fragmentation. In at least one embodiment, the data transfer component 120 may generally constrain the size of the each page to 8 kilobytes (8K). In alternative embodiments, the data transfer component 120 may use other page size constraints. However, as further described below, such page constraints are intended to be non-absolute. Each of the pages 202(1)-202(N) may include a universally unique identifier (UUID), a revision number (RVN), and a value flag that is set to a value that represents "dirty" when the data in the page has changed. For example, the page 202(1) may include a UUID 204, a RVN 206, and a value flag 208.

Further, once a row, such as one of the rows 132, is created on a page, the data transfer component 120 may maintain that row of data on the page rather than allow the row of data to change pages. Each of the rows that are created may be assigned a row identifier by the data transfer component 120 that is permanently associated with the corresponding row. The row identifier may specify the designation (e.g., page UUID) of the page that a row resides in, as well as the row designation (e.g., row number) within the page of the row. Accordingly, the row identifiers that are assigned to rows in a page may be monotonically increasing values that are managed on a table-by-table level. This means that when a row is updated or deleted, the row nevertheless logically remains on the same page, and the data transfer component 120 may still check the page for the row of data if another request to interact with the row occurs after the row has already been deleted. Thus, by using such an implementation, the data transfer component 120 may track data changes at a page level, rather than at a row level. Further, a page may be labeled as either changed (i.e., "dirty") or not changed, in which a dirty page includes at least one row that has been modified.

The tracking of changes at a page level may be more efficient in some scenarios in which an application, such as one of the applications 108, changes only a few data rows stored in the data stores, or when the data rows being changed are of the same type. Such selective updating is sparse in nature and rarely results in sweeping changes across the entire set of data at once. Thus, the data transfer component 120 may take advantage of this fact by tracking changes at a page level. In doing so, the data transfer component 120 may track such data changes without resorting to tracking changes at an object-by-object level, or at an attribute-by-attribute level as is the case with conventional database frameworks.

When data on a page is to be updated, the data transfer component 120 may either update the page in place or the page is rebuilt. In various embodiments, the data transfer component 120 may update a page in place when the page is a fixed row size page, and rebuild a page when the page is a variable row size page. The fixed row size page and the variable row size page are described flow in FIGS. 3 and 4. The rebuilding of a page may involve several operations. First, the page is rebuilt. For example, as shown in FIG. 2, the page 202(1) with the UUID 204 may store data in three original sequential data rows 210, 212, and 214, which have the row identifiers 216, 218, and 220, respectively. The data row 212 is to be updated to include additional data bytes. Accordingly, the data transfer component 120 may first copy the data row 210 to a replacement page 222. The data transfer component 120 may then insert a replacement data row 224 for the data row 212 that includes the new data bytes into the replacement page 222. Subsequently, the data transfer component 120 may copy one or more data rows that follow the updated data row, such as the data row 214, into the replacement page 222. The data rows 210 and 214 may retain their row identifiers, i.e., row identifiers 216 and 220 respectively, while the data transfer component 120 may provide the replacement data row 224 with the row identifier 218 from the data row 212. The page 202(1) is then deleted, and the replacement page 222 may be provided with the UUID 204 of the page 202(1), an updated RVN 226, and a value flag 228 that indicates the page is "dirty".

Second, since the logical position of each row in a page is tracked by a corresponding absolute offset (row pointer) and one or more relative offsets (column offsets) in a corresponding page index, an absolute offset for each data row in the page that follows the updated data row 224 (e.g., the data row 214) may be updated by having a delta value added to them. For example, if the new updated data row 224 is five bytes bigger after the update, then an absolute offset for the data row 214 may have five added to it. However, all the relative offsets may remain the same. Conversely, in another example, if the replacement data row 224 that replaced the data row 212 is five bytes smaller after the update, then an absolute offset to the data row 214 may have five subtracted from it, while the column offsets may remain the same. The use of absolute offsets and relative offsets to track the rows in a page is further described in detail below with respect to FIGS. 3 and 4.

Alternatively, in the update in place of a page, the data transfer component 120 may initially modify a data row in the page to include modified data that has the same data byte length as the original data in the data row. The RVN of the page may then be updated, and the value flag of the page may be set to "dirty". Further, since the modified data row includes data with the same data byte length, the absolute offset (row pointer) associated with each of the one or more data rows in the page that follows the modified data row as well as their corresponding relative offsets (column pointers) may remain the same.

In some embodiments, because the page size constraints are intended to be non-absolute, a data update to a page that results in the page exceeding a page size constraint is not problematic. For example, when a page has a page size constraint of 8K, as described above, and a string value that is 32K in size is added to a row in the page, the data transfer component 120 may grow the page in size to support the storage of this new string value. However, since updates that cause a page to exceed a predetermined page size constraint may happen infrequently, the impact of such occasional oversize pages on the overall operating efficiency of the dataset structure 126 may be minimal.

The tables 128 of the dataset structure 126 that are used by the data transfer component 120 may come in two forms: fixed sized row tables and variable row size tables. In a fixed sized row table, all of the columns of data in the table are of a fixed size. Conversely, if any column of data in a table is a variable size, then the table is a variable row size table. The use of the fixed row size tables or the variable row size tables as part of the dataset structure 126 are described below in FIGS. 3 and 4.

Figure 3:
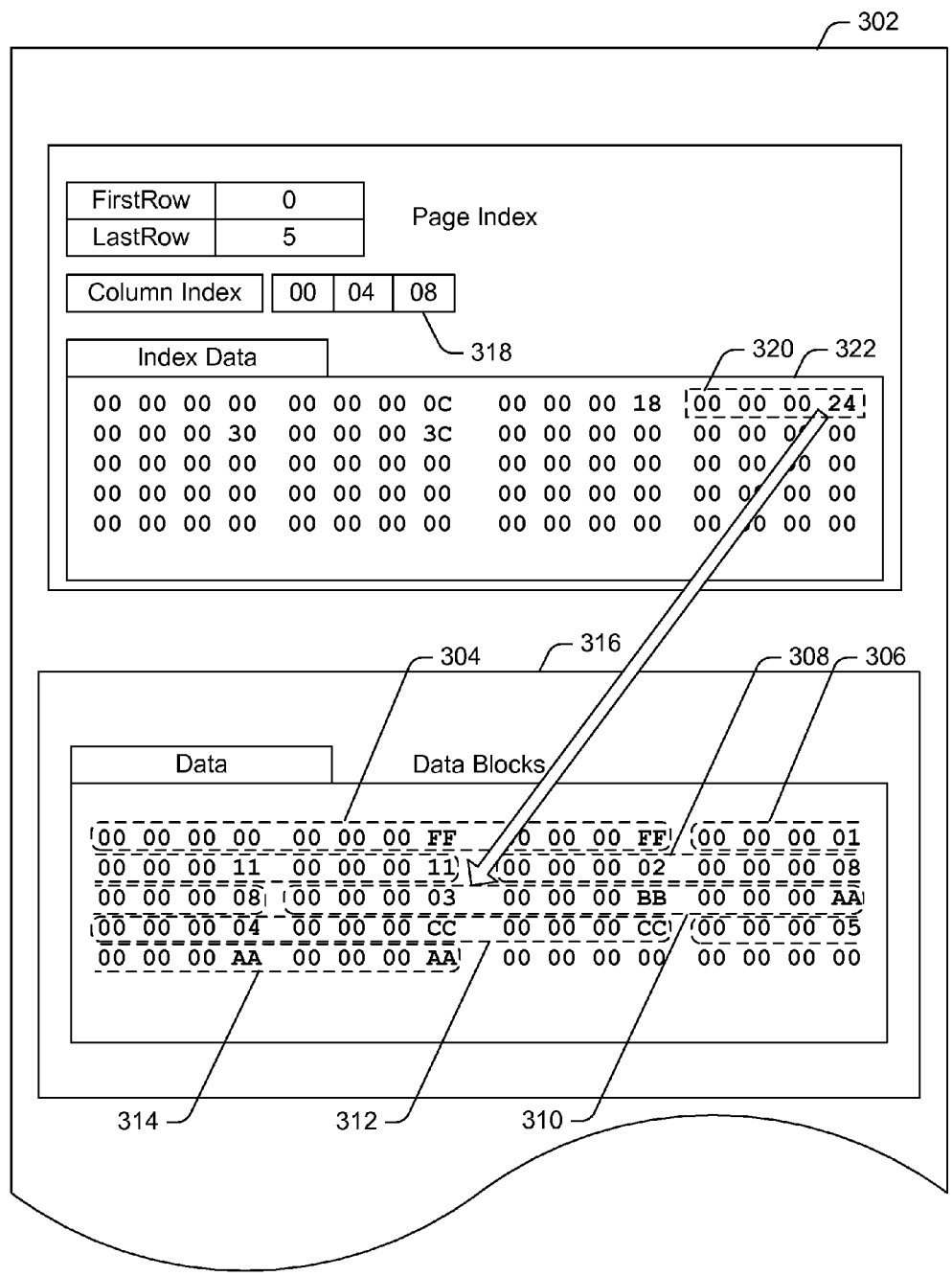
FIG. 3 is an illustrative block diagram that describes the use of a single column index to track rows in a fixed row size table of the dataset structure.

FIG. 3 is an illustrative block diagram that describes the use of a single column index to track rows in a fixed row size table of the dataset structure. For each page of the fixed row size table, a single column index that includes one or more relative offsets may be generated to track rows of data on the fixed row size page. For example, a fixed row size page 302 may include six rows of data, "row 0" 304, row 1" 306, "row 2" 308, "row 3" 310, "row 4" 312, and "row 5" 314 in a data content 316. Since each row is fixed in size in terms of bytes of data, a single column index 318 may be used to locate each row of data. As shown, a 4-byte data block 320 in the index data 322 may include the absolute offset for "row 3" 310. The value of the data block 320 is "00 00 00 24" in hexadecimal, which is "36" in decimal form. This value corresponds to the absolute position of the beginning of "row 3" 310 of data in the data content 316. Subsequently, by using the column index 318, which has a first value of "00", the data transfer component 120 may determine that the first column of data in "row 3" 310 starts at byte 36 in "row 3" 310 (as 36+0=36). Accordingly, the data transfer component 120 may determine that the first column of the data in "row 3" 310 is "00 00 00 03", which may be the row identifier for the row in this example. However, it will be appreciated that an actual row identifier may contain more values, as the row identifier may include a page number and a logical row number.

Likewise, by using the second value "04" in the column index 318, the data transfer component 120 may determine that the second column of data in "row 3" 310 starts at byte 40 in "row 3" 310 (as 36+4=40). Accordingly, the data transfer component 120 may determine that the second column of data in "row 3" 310 is "00 00 00 BB". Further, by the using the third value "08" in the column index 318, the data transfer component may determine that the third column of data in "row 3" starts at byte 44 in "row 3" 310 (as 36+8=44). Accordingly, the data transfer component 120 may determine that the third column of data in "row 3" 310 is "00 00 00 AA".

Figure 4:
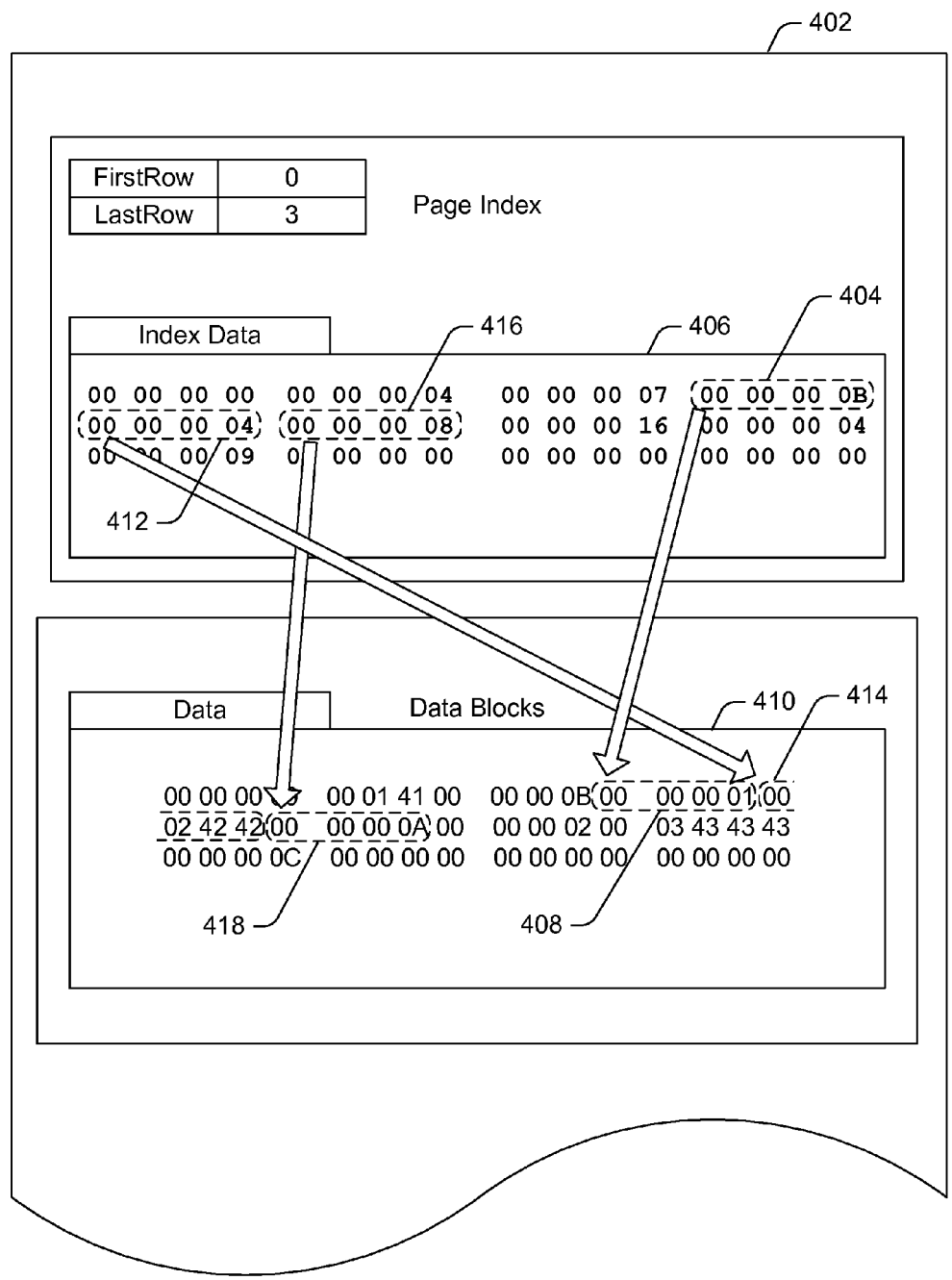
FIG. 4 is an illustrative block diagram that describes the tracking of rows in a variable row size table using index data.

FIG. 4 is an illustrative block diagram that describes the tracking of rows in a variable row size table using index data. For each page of the variable row size table, index data in each variable row size page may track both the rows and the columns for each row of data. For example, a variable row size page 402 of a variable row table may be organized according to a scheme that has two columns of data, such as a name (string) and a value (integer). The rows of data may be ("A", 11), ("BB", 10), and ("CCC", 12). Accordingly, a 4-byte data block 404 in the index data 406 of the variable row size page 402 may include the absolute offset for the beginning of a second row of data in the data content 410. For instance, the value of the data block 404 may be "00 00 00 0B" in hexadecimal form, which is "11" in decimal form. Thus, by using the 4-byte data block 404 in the index data 406, the data transfer component 120 may locate the beginning of the first column 408 of the second row. In this instance, the first column 408 of the second row holds the value "00 00 00 01", which may be the row identifier of the row. Once again, it will be appreciated that an actual row identifier may contain more values, as the row identifier may include a page number and a logical row number.

Further, a 4-byte data block 412 that follows the data block 404 may be a relative offset (e.g., 00 00 00 04) for the second column 414 of data in the second row. Thus, by using the data block 412, the data transfer component 120 may locate the beginning of the second column 414. Accordingly, the data transfer component 120 may further determined that the second column 414 holds the UTF-8 value "00 02 42 42", which translates into text "BB". Another 4-byte data block 416 that follows the data block 412 may be the relative offset (e.g., 00 00 00 08) for a third column 418 in the second row. Once again, by using the data block 416, the data transfer component 120 may locate the beginning of the third column 418. Accordingly, the data transfer component 120 may determine that the third column 418 holds the hexadecimal value "00 00 00 0A", which translates into the decimal value "10". Thus, unlike in a fixed row size page, each row of data in a page may be provided with its own relative offsets for its columns in addition to an absolute offset, and such relative offsets cannot be shared across different rows.

Figure 5:
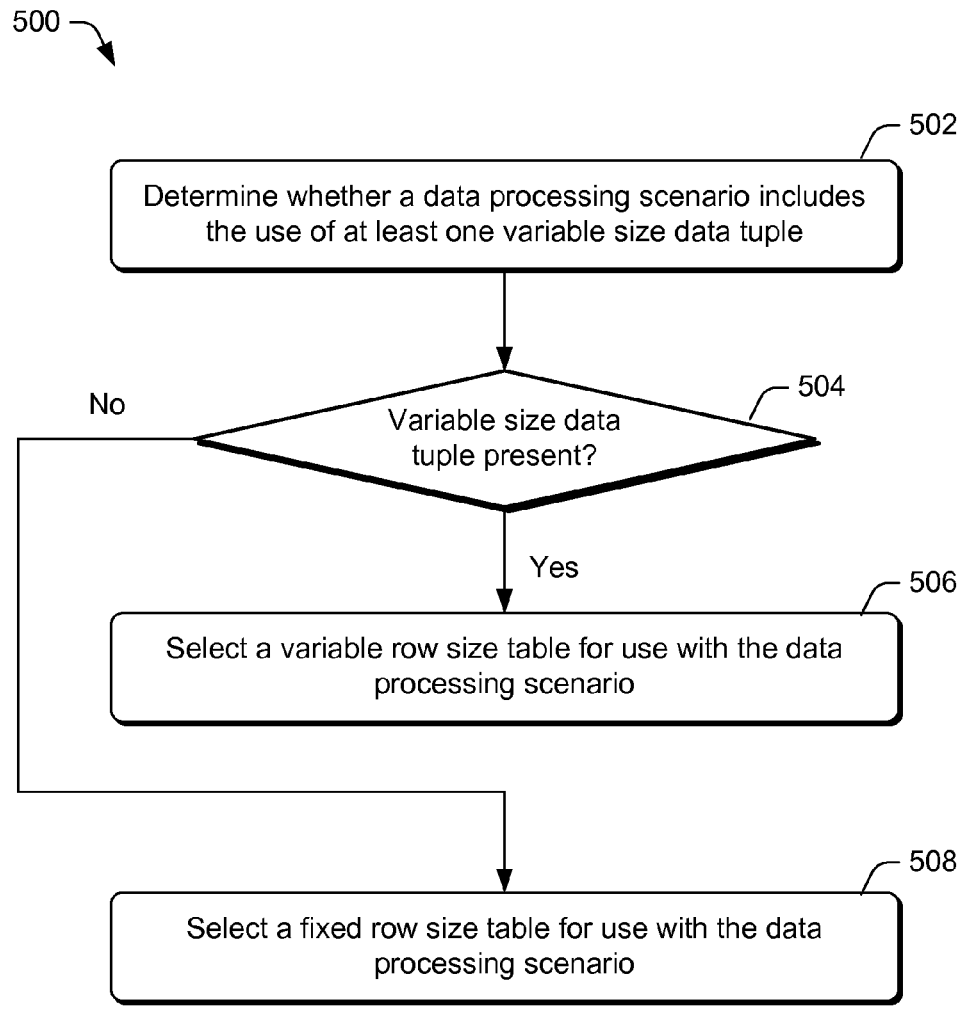
FIG. 5 is a flow diagram of an illustrative process for selecting one of a variable row size table or a fixed row size table for use in the dataset structure.

FIG. 5 is a flow diagram of an illustrative process 500 for selecting one of a variable row size table or a fixed row size table for use in the dataset structure. The process 500 is illustrated as a collection of blocks in a logical flow graph, which represents a sequence of operations that can be implemented in hardware, software, or a combination thereof. In the context of software, the blocks represent computer-executable instructions stored on one or more computer-readable memory that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At block 502, a determination may be made as to whether a data processing scenario includes the use of at least one variable size data tuple. For example, the data processing scenario may be an e-commerce situation in which online orders for merchandise are received and merchandise are billed and shipped according to the online orders. At decision block 504, if it is determined that the data processing scenario may include the use of at least one variable size data tuple ("yes" at decision block 504), the process 500 may proceed to block 506.

At block 506, the variable row size table may be selected for use with the data processing scenario. Each of the one or more data tuples used in the data processing scenario may be stored in a corresponding row of the variable row size table. In various embodiments, the transaction of data using the variable row size table may involve data transfers between entities, as well as create, read, update and/or delete (CRUD) data with respect to a dataset structure (e.g., the dataset structure 126) that implements the variable row size table. However, if it is determined that the data scenario does not include the use of any variable size data tuples ("no" at decision block 504), the process 500 may proceed to block 508.

At block 508, the fixed row size table may be selected for use with the data processing scenario. Each of the one or more data tuples used in the data processing scenario may be stored in a corresponding row of the fixed row size table. In various embodiments, the transaction of data using the variable row size table may involve data transfers between entities, as well as create, read, update and/or delete (CRUD) data with respect to a dataset structure (e.g., the dataset structure 126) that implements the fixed row size table.

The performance of each type of table in the data processing scenario may be dependent upon factors such as the size of the data that is stored in each row of the tables in the dataset structure 126, network bandwidth, network speed, and/or available processing resources (e.g., processing power, memory, etc.) of the computing devices that manipulate the data in the tables. A fixed row size table may take more bandwidth to transfer across a network than a variable row size table since each row in the fixed row size table has the same byte size regardless of the size of the actual data that is stored in each row. However, in some scenarios, any transfer efficiency gained by using a variable row size table over a fixed sized row table may be offset to various degrees by the transfer of additional index data across a network. This is because the index data in a variable row size table, which includes the relative offsets for the columns associated with every row of data, may be bigger in size than the index data for a fixed row size table.

Further, less processing power may be used to perform transactions on data in a fixed row size table than a variable row size table since the column offsets in the table are identical for each row. On the other hand, the performance of transactions on data in a variable row size table may consume more processing power as the columns in the rows of data cannot be systematically determined as in the case of a fixed row size table. Rather, the columns in each data row may be calculated using the corresponding absolute offset and column offsets before the data in each row may be transacted. For example, when network bandwidth is limited but processing power for transacting the data is ample at computing devices that are parties to a data transfer, one or more variable row size tables may provide faster performance when used with the data transfer component 120. However, when network bandwidth is abundant but processing power at the computing devices is limited, one or more fixed sized row tables may provide faster performance when used with the data transfer component 120.

The performance of each type of table in the data processing scenario may be measured using various criteria. In some embodiments, the performance of each type of table for the data processing scenario may be tested using the transfer and processing of actual data. In other embodiments, the performance of each type of table for the data processing scenario may be tested using simulated data transfer and processing transactions. The performance of each type of table may be gauged using one or more quantitative measurements (e.g., latency, overall data transfer speed, data read speed, data write speed, data error rate, data loss rate, and/or the like), and/or one or more qualitative measurements (e.g., accuracy of the data that is retrieved, load handling ability, and/or the like).

In additional embodiments, the data transfer component 120 may implement a data streaming scheme that includes service components having internal pipelines. Such service components may further reduce the latency associated with using multiple service components 118 to process a piece of data. The use of such a data streaming scheme may enable the deserialization of a piece of data, processing of the piece of data, and the serialization of the piece data by the various service components to at least partially overlap so that overall latency may be reduced.

Figure 6:
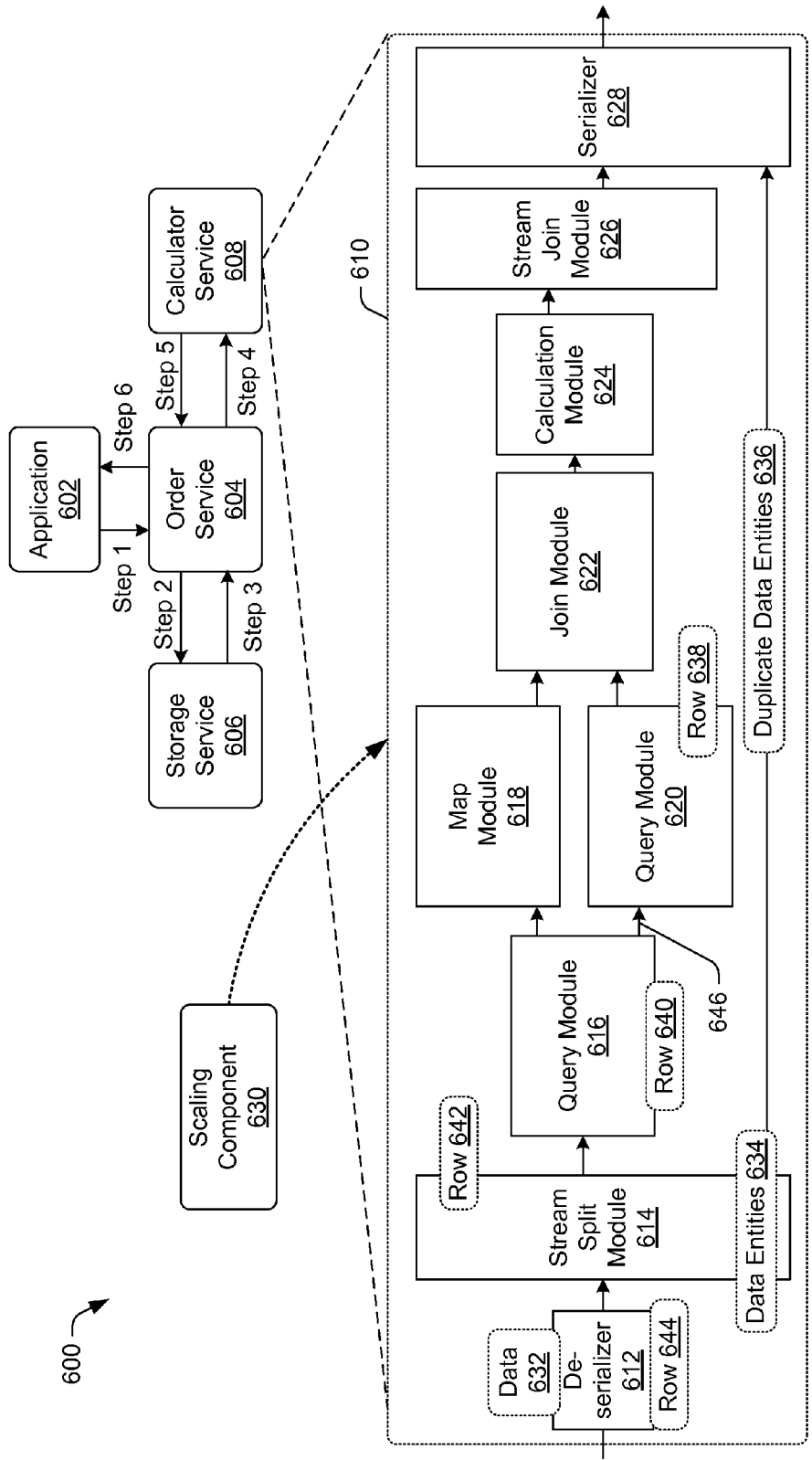
FIG. 6 is an illustrative block diagram that describes the overlapping of deserialization, data processing, and serialization as carried out by example service components to reduce latency.

FIG. 6 shows a block diagram that illustrates the overlapping of deserialization, data processing, and serialization as carried out by example service components for an application to reduce latency. In the example implementation 600, an application 602 may be an e-commerce application that displays order information for online purchaser orders. In order to fulfill the orders, the application 602 may call multiple service components that include an order service component 604, a storage service component 606, and a calculator service component 608.

The order service component 604 may be a service that receives an order identifier from the application 602, and further calls upon the storage service component 606 and the calculator service component 608 to process the order associated with the order identifier so that item and charge data associated with the order may be returned to the application 602.

Accordingly, in order for the application 602 to display charges for an online purchase order, an order identifier may be passed from the application 602 to the order service component 604 at step 1. At step 2, the order identifier is passed by the order service component 604 to the storage service component 606, which loads the appropriate order information from a data store, such as the data stores. At step 3, the storage service component 606 returns the order information to the order service component 604. The order service component 604 may then pass the order information to the calculator service component 608 at step 4. The calculator service component 608 may calculate the charges for the items listed in the order information, and may provide the charge information back to the order service component 604 at step 5. At step 6, the order service component 604 may then pass the item and charge information back to the application 602 for display.

In a conventional arrangement, a piece of data that is passed between two different services is initially serialized by a sending service component for transmission over a network to a receiving service component. The data is then deserialized by the receiving service component prior to being processed at the receiving service component. Thus, in the context of service components described in FIG. 6, serialization and deserialization of the entire data occurs at each of the steps 2-5, which may cause increased latency.

However, services components having internal pipelines may enable at least some overlapping of data serialization, data processing, and data deserialization. Such service components may reduce the latency experienced by a client application, such as the application 602. For example, as shown in FIG. 6, the calculator service component 608 may include an example internal streaming pipeline 610 that reduces the overall latency experienced by the application 602. The example streaming pipeline 610 may include a deserializer 612, a stream split module 614, a query module 616, a map module 618, a query module 620, a join module 622, a calculation module 624, a stream join module 626, and a serializer 628. Additionally, as described below in FIG. 15, a scaling component 630 may further instantiate modules for the streaming pipeline 610.

In operation, incoming data 632 arriving at the calculator service component 608 from the order service component 604 may enter the stream pipeline 610 to be deserialized by the deserializer 612. The incoming data 632 may include a set of data entities 634, such as items, item descriptions, purchase descriptions, and purchase charges, discounts, promotion, tax charges, and/or the like. Following deserialization, the data entities 634 may be passed to the stream split module 614. The stream split module 614 may generate a duplicate set of data entities 636 based on the set of data entities 634, and send the duplicate set of data entities 636 to the stream joining module 626 to be serialized and sent out of the streaming pipeline 610 to the order service component 604 for further processing. The duplicate set of data entities 636 may be serialized by the serializer 628 and sent out of the calculator service at any time after duplication. For example, the duplicate set of data entities 636 may be serialized while one or more other modules in the streaming pipeline are simultaneously processing the data entities 634.

For example, the set of data entities 634 may be sent by the stream split module 614 to the query module 616. The query module 616 may parse out entities from the set of entities 634 that are purchase charges, i.e., belonging to the type "charge group". For example, purchase charges may include item cost, item shipping cost, item tax, and the like, for each purchased item. Subsequently, the set of entities may be further sent to the map module 618 and the query module 620 for processing. The query module 620 may parse out entities from the set of entities 634 that are line items, i.e., items that are purchased. The map module 618 and the join module 622 may work in conjunction to group each line item with its associated purchase charges. Once such grouping has been accomplished, the entities may be sent to the calculation module 624 so that the purchase charges for each line item may be totaled up. The stream joining module 626 may then combine the one or more purchase charges with the data entities 634 for serialization and transmission to the order service component 604.

In various embodiments, the grouping performed by the map module 618 may be a blocking step that holds up some processing as the grouping may not occur until all the entities in the incoming data have been received by the map module 618. However, because of the multi-pathway nature of the streaming pipeline 610, the query module 620 may continue to process the entities even when the map module 618 is blocked (i.e., busy processing data). Likewise, the sending of the duplicate set of data entities 636 is also unhindered by the blocking of the map module 618. Thus, the multi-path way nature of the streaming pipeline 610 may reduce latency.

Moreover, since each of the service components may call upon the data transfer component 120 to handle serialization and deserialization of the data, the nature of the in-memory dataset structure 126 that is used by the data transfer component 120 may further decrease latency. In various embodiments, the entities in the data that is processed by the streaming pipeline 610 may be stored in rows in the dataset structure 126, such as the row 132. Accordingly, the rows of data may be sent individually through the various modules of the streaming pipeline 610.

For example, as shown in FIG. 6, the data 632 may be propagated through the streaming pipeline such that portions (e.g., rows) of data are being process on a row-by-row basis. For example, the data 632 may be propagated through the streaming pipeline 610 such that as a first row 638 of the data may have been propagated through the streaming pipeline 610 and is being processed by the query module 620. Simultaneously, a second row 640 of the data 632 may have been propagated through the streaming pipeline 610 and is being processed by the query module 616, while a third row 642 of the data 632 may be at the point in the streaming pipeline 610 where it is being duplicated by the stream split module 614. Further, a fourth row 644 of the data 632 may be simultaneously being deserialized by the deserializer 612.

In this way, the configuration of one or more service components as streaming pipelines, when combined with the use of the in-memory dataset structure 126, may further reduce latency. In other words, the combination may enable data to be consumed as soon as it is produced at various stages in a streaming pipeline. In this way, a service component with a streaming pipeline, such as the streaming pipeline 610, may serialize and output processed data derived from a portion of the data 632 while still simultaneously receiving another portion of the data 632. In contrast, in conventional data processing, a service component may only output processed data when incoming data 632 has been processed in its entirety by the service component. It will be appreciated that the streaming pipeline 610 is an example pipeline, and a pipeline that includes different modules may be constructed for different service components.

Thus, in scenarios in which each service component that is called upon by an application may include an internal streaming pipeline, the application may in some instances receive processed data that is derived from some original data as the application is still sending the original data to the service components for processing. The use of the in-memory dataset structure 126 to reduce latency during streaming of data between two entities is further illustrated in FIGS. 7-11.

In various embodiments, the streaming of data using the dataset structure 126 may involve the grouping of one or more rows in the dataset structure 126 into at least one row pool, as well as the grouping of the index data (i.e., row pointers, column offsets) that identifies the locations of the one or more rows into at least one corresponding index pool. Accordingly, a row pool is an organizational construct that may include as few as a single row, a page of rows, as many as multiple pages of rows, or any variation in between. Each of the rows may be a variable row size or a fixed row size. Further, each of the row pools may be associated with a corresponding index pool that is an organization construct that includes the index data for the one or more pages. The organization of rows of the dataset structure 126 and their corresponding index data into row pools and index pools is further illustrated in FIG. 7.

Figure 7:
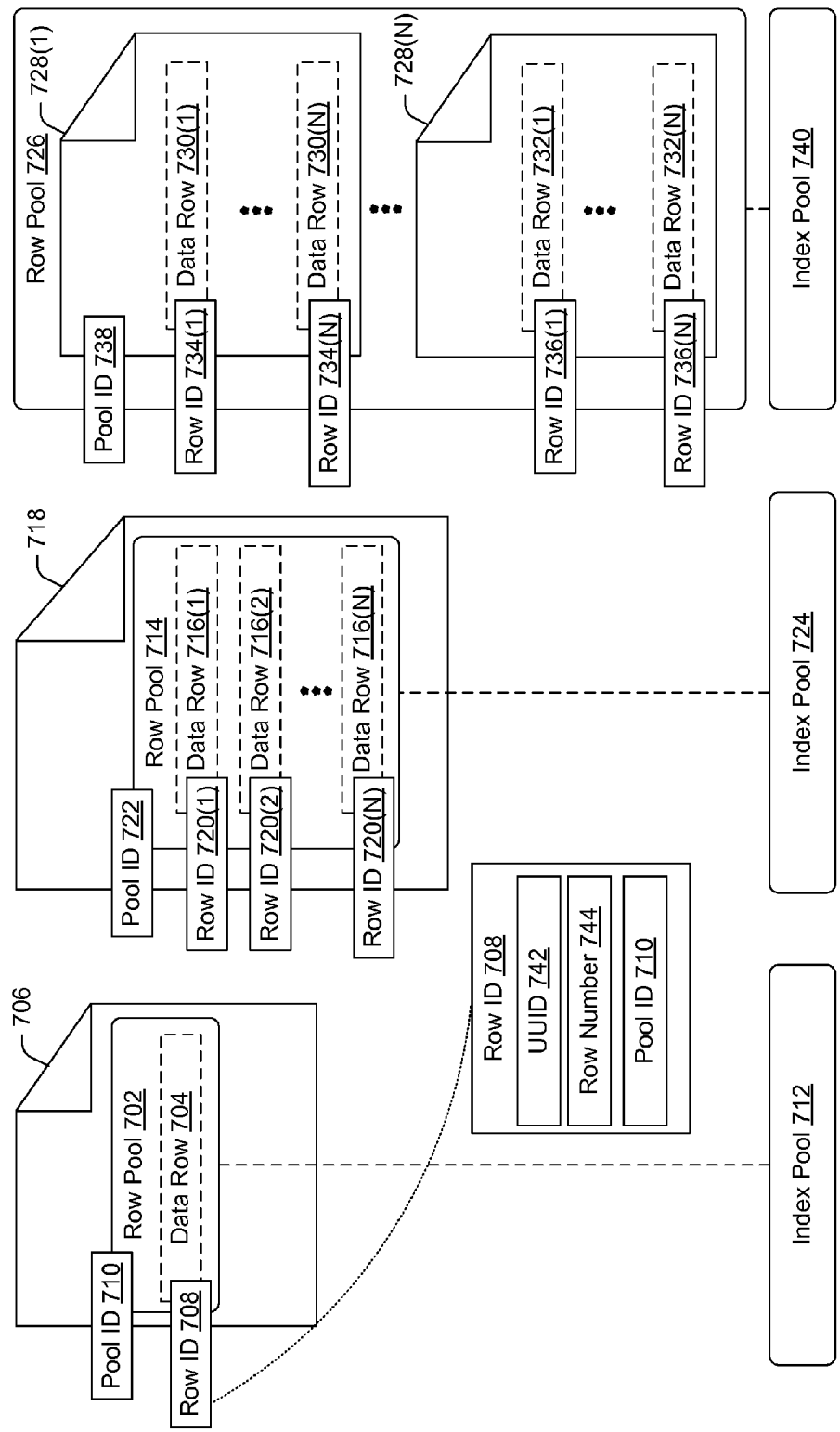
FIG. 7 is an illustrative block diagram that shows data rows and their corresponding index data in a dataset structure that are organized into row pools and index pools.

FIG. 7 is an illustrative block diagram that shows the example organization of data rows and their corresponding index data in a dataset structure into row pools and index pools. As shown, an example row pool 702 may include a data row 704 that resides in a page 706. The data row 704 may have a row identifier 708. Further, the row pool 702 may be assigned a pool identifier 710. The row pool 702 may be additionally associated with an index pool 712. The index pool 712 may include the index data for the row pool 702, such as a row pointer for the data row 704, as well as one or more column offsets for the corresponding columns in the data row 704. The index data in the index pool 712 may be from the data index of the page 706. The data transfer component 120 may associate the index pool 712 and the row pool 702 by storing the pool identifier 710 of the row pool 702 in a portion of the index pool 712.

In another instance, an example row pool 714 may include a plurality of data rows 716(1)-716(N) that resides in a page 718. Each of the data rows 716(1)-716(N) may have a row identifier, such as the respective row identifiers 720(1)-720(N). The row pool 714 may be assigned a pool identifier 722. The row pool 714 may be additionally associated with an index pool 724 that includes the index data for each of the data rows in the row pool 714, i.e., row pointers and one or more column offsets for each row. The index data in the index pool 724 may be from the index of the page 718. The data transfer component 120 may associate index pool 724 the row pool 714 by storing the pool identifier 722 of the row pool 714 in a portion of the index pool 724.

In an additional instance, an example row pool 726 may include data rows that reside in a plurality of pages, such as pages 728(1)-728(N). The page 728(1) may include one or more data rows 730(1)-730(N). Likewise, the page 728(N) may include one or more data rows 732(1)-732(N). Each of the data rows 730(1)-730(N) and data rows 732(1)-732(N) may have a plurality of row identifiers, such as the respective row identifiers 734(1)-734(N) and row identifiers 736(1)-736(N). Further, the row pool 726 may be assigned a pool identifier 738. The row pool 726 may be associated with an index pool 740 that includes the index data for each of the data rows in the row pool 726, i.e., row pointers and one or more column offsets for each row. The index data in the index pool 740 may be from the data indices of the pages 728(1)-728(N). The data transfer component 120 may associate the index pool 740 with the row pool 726 by storing the pool identifier 738 of the row pool 726 in a portion of the index pool 740.

In order to implement the concept of row pools and index pools as organizational constructs for the dataset structure 126, each of the row identifiers for the rows in the dataset structure 126 may be further modified to include an additional piece of information that identifies the row pool that the row belongs. Thus, recall that as described, a row identifier for a data row (e.g., row 136) may contain information such as the UUID of the page that the data row reside in, as well as the row designation (e.g., row number) of the data row. Each of the row identifiers may be further modified to include a pool designation (e.g., pool identifier) of the row pool in which the data row resides. For example, a row identifier may include bytes that represent a UUID 742, a row number 744, and the pool identifier 710. In this way, the data transfer component 120 may use the row identifier of each row to locate and distribute the rows among different entities.

Further, the division of rows in a dataset structure into row pools may decrease latency during data transfer between entities. For example, the division of data rows in a page into row pools may enable a service component to receive and process a row pool without waiting for the rest of the row pools to arrive from another service component.

FIGS. 8-11 show illustrative scenarios that depict the use of row pool and index pool constructs during the transfer of data between two entities by the data transfer component 120. In some embodiments, the two entities may be service components, such as the order service component 604 and the storage service component 606, or a service component and a client application, such as the application 602. In other embodiments, the two entities may be two service component modules in a service component pipeline, such as the query module 616 and the map module 618. In additional embodiments, the two entities may be two different applications, or any other entities that do not share a common source of memory.

Figure 8:
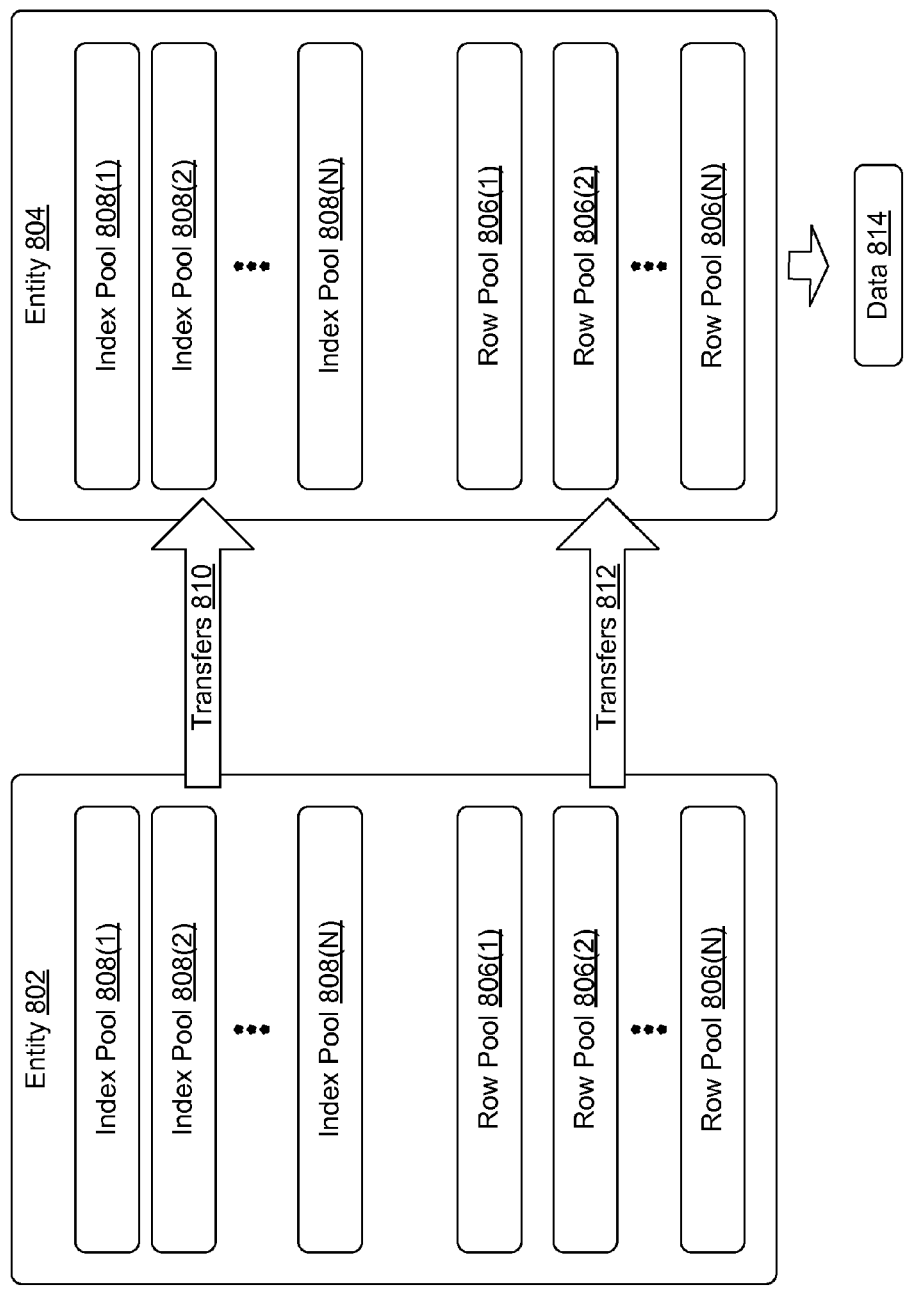
FIG. 8 is an illustrative block diagram that shows the streaming of data from a sending entity to a receiving entity without data modification using row pools.

FIG. 8 is an illustrative block diagram that shows the streaming of data from a sending entity to a receiving entity without data modification using row pools. In various embodiments, an entity 802 may send data that is organized into one or more row pools to an entity 804. The data may consist of one or more row pools 806(1)-806(N) and corresponding index pools 808(1)-808(N). Accordingly, the entity 802 may first use the data transfer component 120 to sequentially send each of the index pools 808(1)-808(N) from the entity 802 to the entity 804 during one or more data transfers 810. Subsequently, the entity 802 may use the data transfer component 120 to sequentially send each of the row pools 806(1)-806(N) from the entity 802 to the entity 804 during one or more data transfers 812. Following the transfers, the entity 804 may retrieve data 814 (e.g., one or more of the transferred rows) for processing or modification. The transfer of data between entity 802 and entity 804 as row pools may reduce latency. For example, the entity 804 may have received a request to process data that is in the row pool 806(1). Accordingly, the entity 804 may fulfill such a request as soon as row pool 806(1) arrives at the entity 804 without having to wait for the arrival of the remaining row pools 806(2)-806(N).

Figure 9:
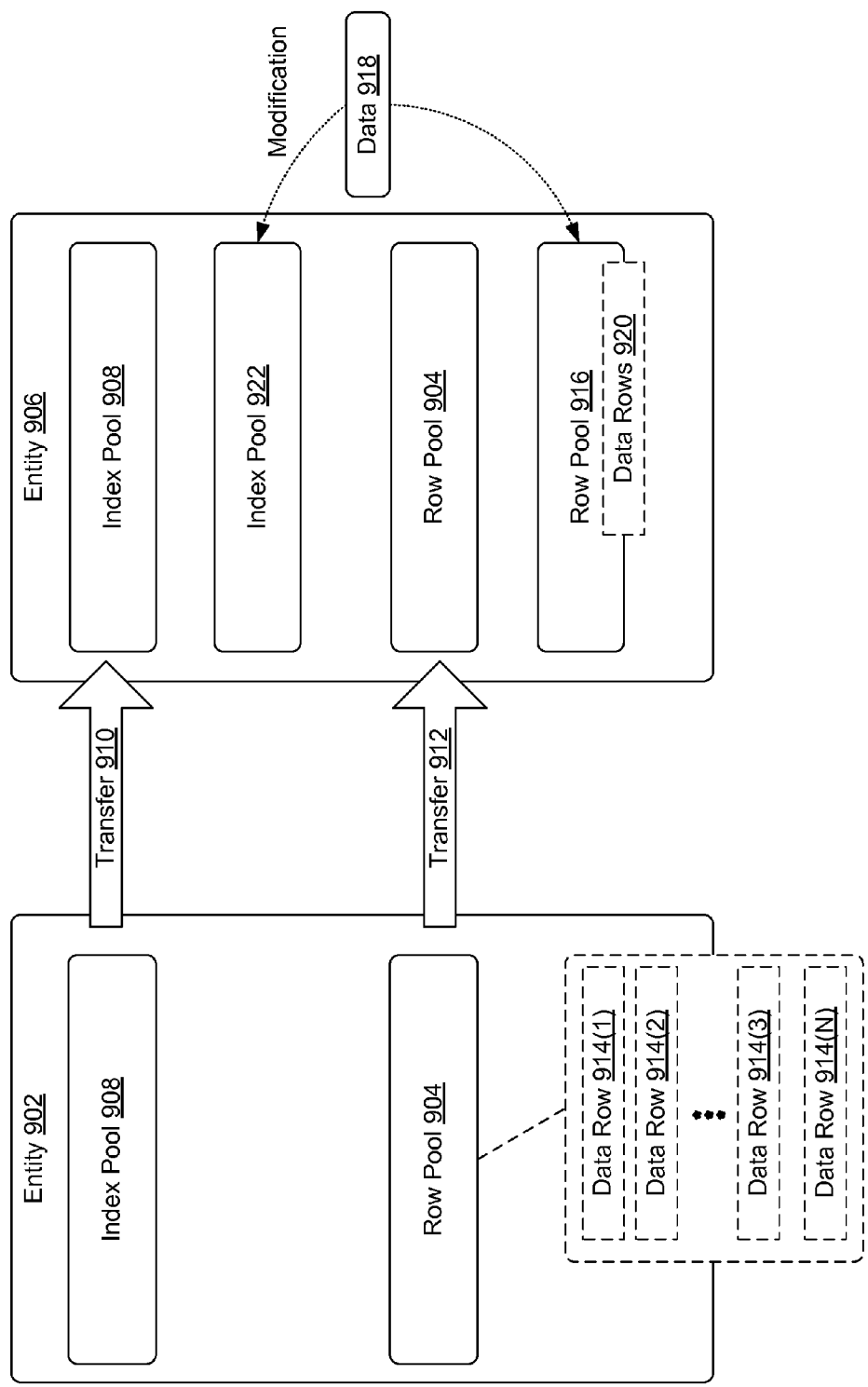
FIG. 9 is an illustrative block diagram that shows the streaming of data from a sending entity to a receiving entity using a row pool during which the receiving entity modifies the data.

FIG. 9 is an illustrative block diagram that shows the streaming of data from a sending entity to a receiving entity using a row pool during which the receiving entity modifies the data. In various embodiments, an entity 902 may desire to send data that is stored in a row pool 904 to an entity 906. Accordingly, the entity 902 may initially use the data transfer component 120 to send an index pool 908 that corresponds to the row pool 904 from the entity 902 to the entity 906 via data transfer 910. Subsequently, the entity 902 may use the data transfer component 120 to send the row pool 904 to the entity 906 via data transfer 912. However, during the data transfer 912, the entity 906 may determine that some data in the row pool 904 is to be modified. The modification may involve operations that create, delete, or change the data in the row pool 904. The entity 906 may decide to make the modification due to its processing of data or based on a request from another entity (e.g., an application). For example, the row pool 904 may include a collection of data rows 914(1)-914(N) that list retail values of products. As such, the entity 906 may receive a request to generate a total for the data rows 914(1) and 914(2). The entity 906 may read and total up the retail values in the data rows 914(1) and 914(2) without having to wait for the data rows 914(3)-914(N) to arrive, thereby reducing latency.

Further, the data transfer component 120, on behalf of the entity 906, may create a new row pool 916, and then stores data 918 derived from the one or more data rows in the row pool 904 (e.g., the total retail value) as one or more new data rows 920 in the row pool 916. In this way, by storing the data 918 in the row pool 916 rather than appending the data 918 into a data row in the row pool 904, latency may be further reduced. Otherwise, latency may have resulted because the entity 906 is generally not permitted to modify any row pool, including the row pool 904, until streaming of remaining the data rows 914(3)-914(N) to the entity 906 is completed.

Lastly, the data transfer component 120 may create a new index pool 922 for the row pool 916. In some embodiments, the entity 906 may further use the data transfer component 120 may to consolidate the row pool 904 and the row pool 916 into a single row pool, and also consolidate the index pool 908 and the index pool 922 into a single index pool.

In contrast, in a scenario in which the entity 906 derives the data 918 after the streaming of the row pool 904 to the entity 906 is completed, the data transfer component 120 may store the data 918 in the row pool 904 rather than create the row pool 916 to store the data 918.

Figure 10:
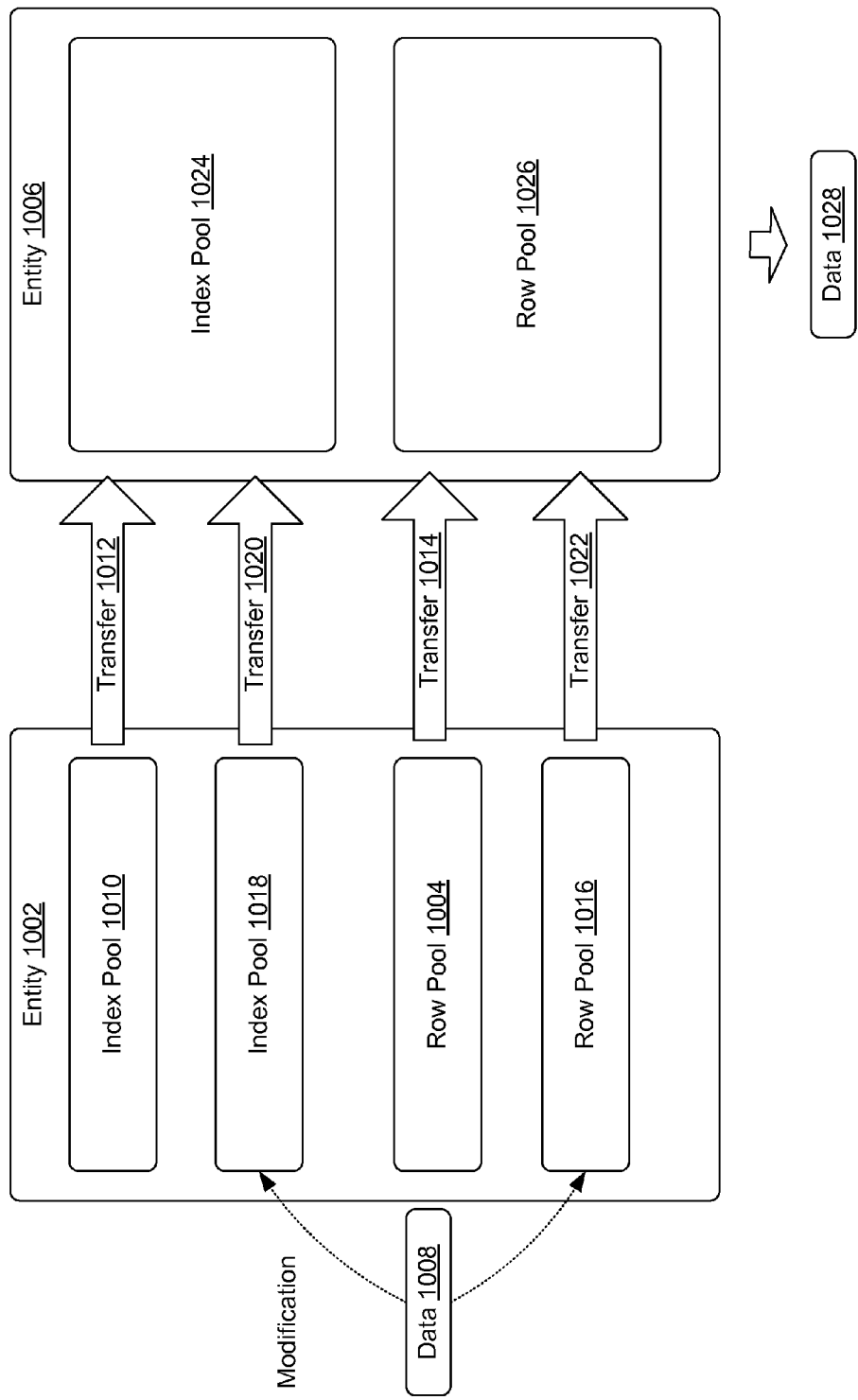
FIG. 10 is an illustrative block diagram that shows the streaming of data from a sending entity to a receiving entity using row pools during which the sending entity modifies the data.

FIG. 10 is an illustrative block diagram that shows the streaming of data from a sending entity to a receiving entity using row pools during which the sending entity modifies the data. In various embodiments, an entity 1002 may decide to modify a row pool 1004 that is to be transferred from the entity 1002 to an entity 1006. The modification may involve operations that create, delete, or change the data in the row pool 1004. As part of the modification, the entity 1002 may determine that data 1008 (e.g., one or more additional data rows) are to be inserted into the row pool 1004. The entity 1002 may decide to make the modification due to its processing of data or based on a request from another entity (e.g., an application).

However, rather than completing the modification before sending the row pool 1004, the data transfer component 120 may instead perform the transfer of row pool 1004. The data transfer component 120 may transfer the row pool 1004 by sending an index pool 1010 that corresponds to the row pool 1004 to the entity 1006 via transfer 1012, and then sending the row pool 1004 to the entity 1006 via transfer 1014.

However, during the sending of the index pool 1010 or the row pool 1004, the data transfer component 120 may also create a new row pool 1016. The data transfer component 120 may then store the one or more data rows of the data 1008 into the row pool 1016. Subsequently, the data transfer component 120 may also create an index pool 1018 that corresponds to the row pool 1016. Following their creation, the data transfer component 120 may use respective data transfers 1020 and 1022 to send the index pool 1018 and the row pool 1016 to the entity 1006. The data transfers 1020 and 1022 may be implemented in such a way that the index pool 1010 and the index pool 1018 are consolidated into a combined index pool 1024 at the entity 1006, and the row pool 1004 and the row pool 1016 are consolidated together into a combined row pool 1026. For example, the pool identifier used by the row pool 1016 and index pool 1018 may be modified by the data transfer component 120 to match the pool identifier used by the row pool 1004 and the index pool 1010. After the transfers are completed, the entity 1006 may retrieve data 1028 from the row pool 1026 for additional processing or modification.

Thus, by at least partially overlapping the transfer of the row pool 1004 and the creation of the row pool 1016 to store the new data 1008, the implementation described in FIG. 10 may reduce latency as compared to conventional data transfer approaches. In contrast, conventional data transfer approaches may dictate that a piece of data is to be modified prior to being transferred from one entity to another entity, which may result in increased data transfer latency.

Figure 11:
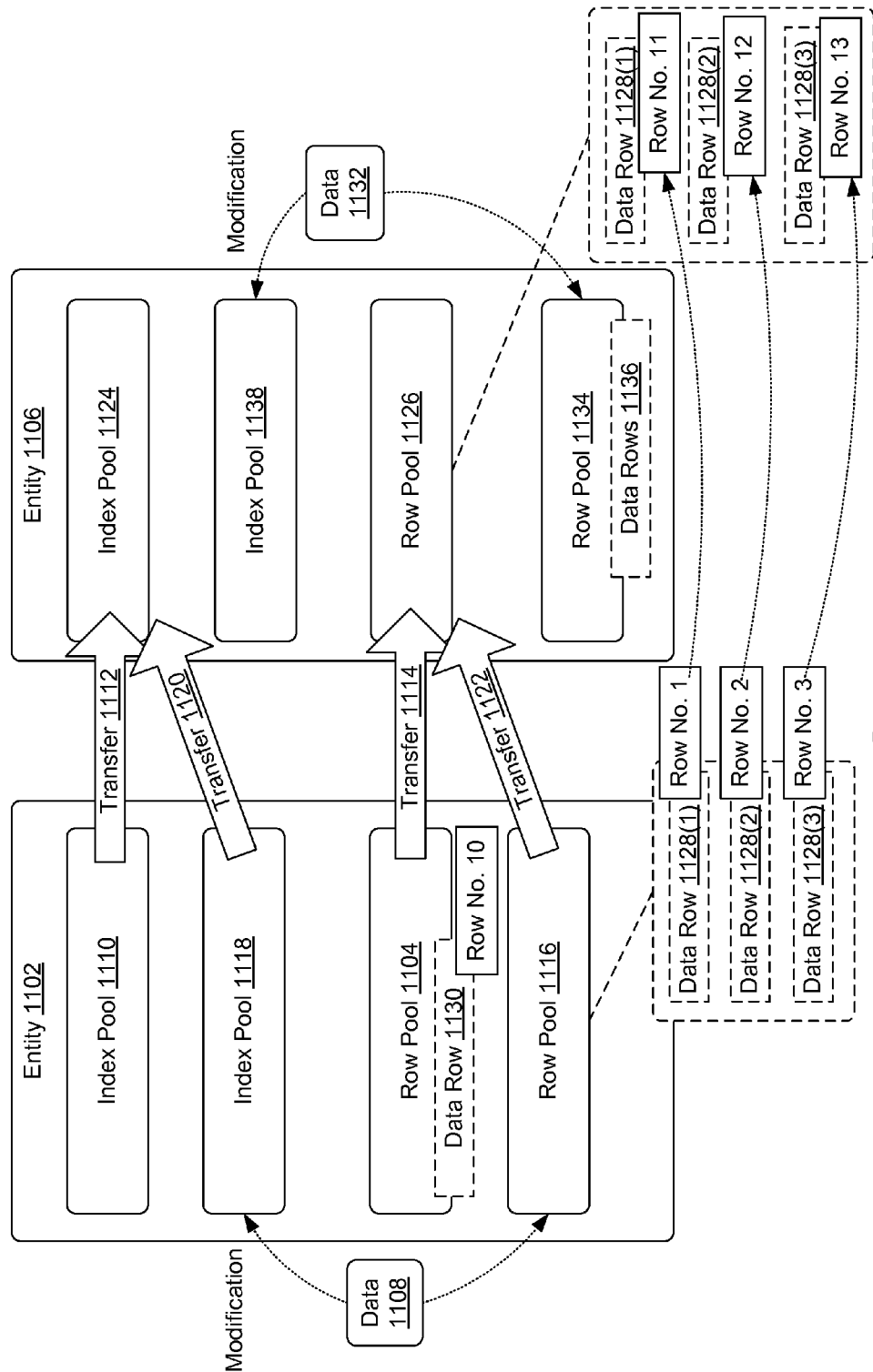
FIG. 11 is an illustrative block diagram that shows the streaming of data from a sending entity to a receiving entity using row pools during which both entities modify the data.

FIG. 11 is an illustrative block diagram that shows the streaming of data from a sending entity to a receiving entity using row pools during which both entities modify the data. In essence, the scenario described in FIG. 11 is a combination of the implementation described in FIGS. 9 and 10. In various embodiments, an entity 1102 may decide to modify a row pool 1104 that is to be transferred from the entity 1102 to an entity 1106. The modification may involve operations that create, delete, or change the data in the row pool 1104. As part of the modification, the entity 1102 may determine that new data 1188 (e.g., one or more additional data rows) is to be added to the row pool 1104. The entity 1102 may decide to make the modification due to its processing of data or based on a request from an application.

However, rather than completing the modification before sending the row pool 1104, the data transfer component 120 may instead perform the transfer of row pool 1104. The data transfer component 120 may transfer the row pool 1104 by sending an index pool 1110 that corresponds to the row pool 1104 to the entity 1106 via transfer 1112, and then sending the row pool 1104 to the entity 1106 via transfer 1114.

However, during the sending of the index pool 1110 or the row pool 1104, the data transfer component 120 may also create a new row pool 1116. The data transfer component 120 may then store the one or more data rows of the data 1108 into the row pool 1116. Subsequently, the data transfer component 120 may also create an index pool 1118 that corresponds to the row pool 1116. Following their creation, the data transfer component 120 may use respective transfers 1120 and 1122 to send the index pool 1118 and the row pool 1116 to the entity 1106. The transfers 1120 and 1122 may be implemented in such a way that the index pool 1110 and the index pool 1118 are consolidated into a combined index pool 1124 at the entity 1106, and the row pool 1104 and the row pool 1116 are consolidated together into a combined row pool 1126. For example, the pool identifier used by the row pool 1116 and index pool 1118 may be modified by the data transfer component 120 to match the pool identifier used by the row pool 1104 and the index pool 1110.

In some embodiments, the data transfer component 120 may modify the row numbers of the data rows in the row pool 1116 during the consolidation of the row pools so that such row numbers numerically follow the row number of the last data row in the row pool 1104. For example, as shown in FIG. 11, the row pool 1116 may include data rows 1128 (1)-1128 (3) with respective row numbers "1", "2", and "3" prior to consolidation. Further, the last data row 1130 in the row pool 1104 may have a row number of "10". Accordingly, during the consolidation of the row pool 1104 and the row pool 1116 into the combined pool 1126, the data transfer component 120 may change the row number belonging to each of the data rows 1128(1)-1128(3) to numerically follow the row number "10" of the last data row 1130. In other words, the row numbers of the data rows 1128(1)-1128(3) may be changed to "11", "12", and "13", respectively, during the consolidation of the row pools 1104 and 1116 into the combined row pool 1126.

However, during one or more of the transfers 1112, 1114, 1120 and 1122, the entity 1106 may receive a request to modify the data in the combined row pool 1126. The modification may involve operations that create, delete, or change the data in the combined row pool 1126. As part of the modification, the entity 1106 may determine that new data 1132 (e.g., one or more additional data rows) is to be added to the combined row pool 1126. Accordingly, the data transfer component 120, on behalf of the entity 1106, may create a new row pool 1134 that includes a table, and then stored the data 1132 as one or more new data rows 1136 in the table of the row pool 1134. Lastly, the data transfer component 120 may create a new index pool 1138 for the row pool 1134. In contrast, in a scenario in which the entity 1106 derives the data 1132 after the consolidation of the row pools 1104 and 1116 into row pool 1124, the data transfer component 120 may store the data 1132 in the row pool 1126 rather than create the row pool 1134 to store the data 1132.

Figure 12:
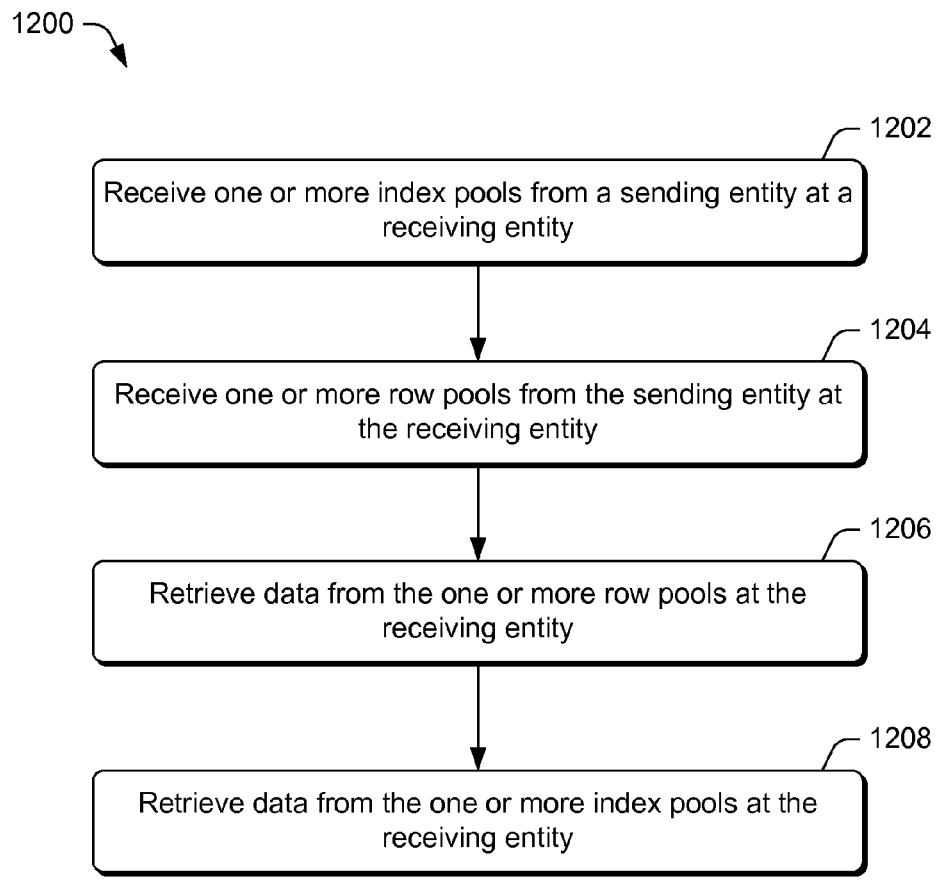
FIG. 12 is a flow diagram of an illustrative process for streaming data from a sending entity to a receiving entity without data modification using row pools.
Figure 13:
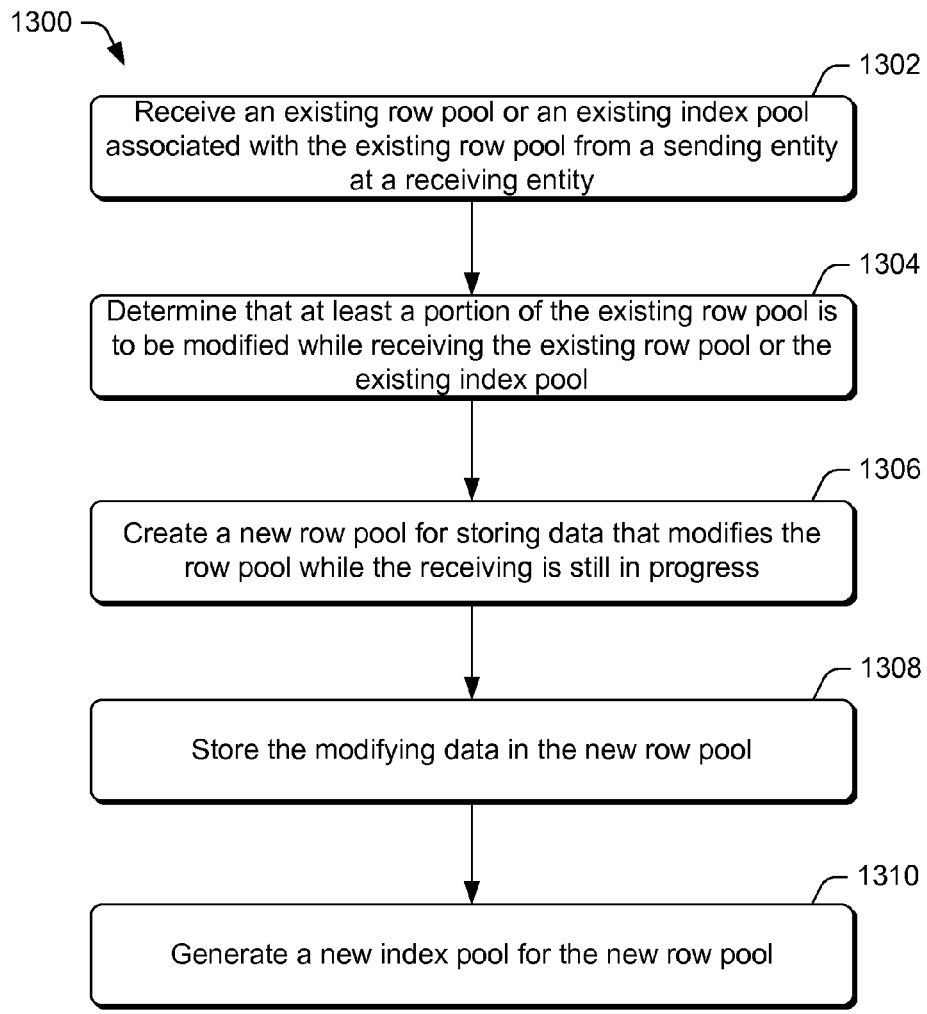
FIG. 13 is a flow diagram of an illustrative process for streaming data from a sending entity to a receiving entity using a row pool during which the receiving entity modifies the data.
Figure 14:
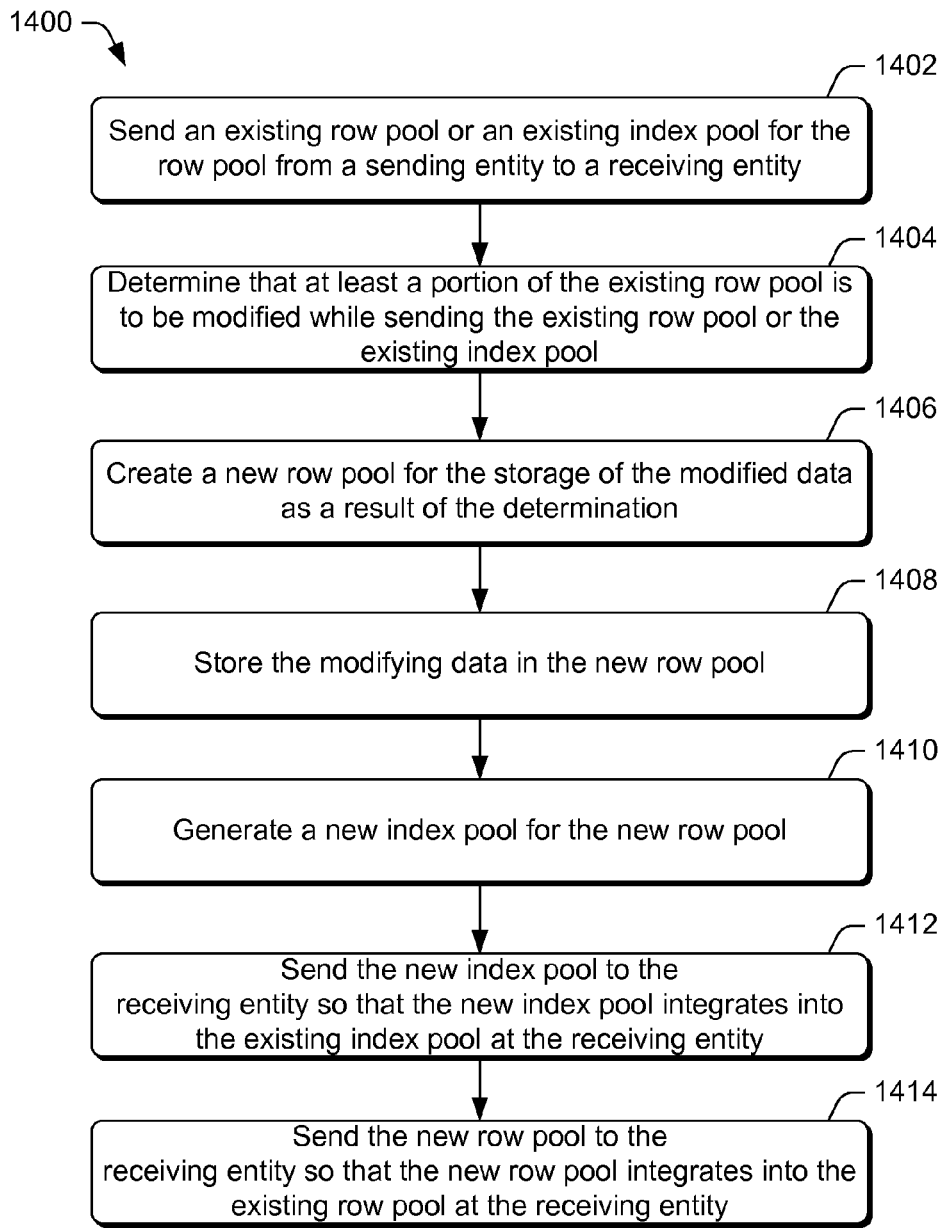
FIG. 14 is a flow diagram of an illustrative process for streaming of data from a sending entity to a receiving entity using row pools during which the sending entity modifies the data.

FIGS. 12-14 show illustrative processes 1200, 1300, and 1400 that depict the use of row pool and index pool constructs during the transfer of data between two entities by the data transfer component 120. Each of the processes 1200, 1300, and 1400 is illustrated as a collection of blocks in a logical flow graph, which represents a sequence of operations that can be implemented in hardware, software, or a combination thereof. In the context of software, the blocks represent computer-executable instructions stored on one or more computer-readable memory that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 12 is a flow diagram of the illustrative process 1200 for streaming data from a sending entity to a receiving entity without data modification using row pools.

At block 1202, a receiving entity may receive one or more index pools from a sending entity. The one or more index pools may be sequentially transferred from the sending entity to the receiving entity by the data transfer component 120. Each index pool may include index data for one or more rows in a corresponding row pool, such index data may include row pointers and one or more column offsets for each data row in the corresponding row pool.

At block 1204, the receiving entity may receive one or more row pools that correspond to the one or more index pools from the sending party. Each row pool may include one or more data rows that store information for a table, such as one of the tables 128, which is part of the dataset structure 126. In some alternative embodiments, the transfer of the one or more row pools may be performed prior to the transfer of the one or more corresponding index pools.

At block 1206, the receiving entity may retrieve data from at least one data row in the one or more row pools. The receiving party may then process or modify the data. However, in some embodiments, the receiving entity may process or modify the data in a received row pool without waiting for the arrival of remaining row pools. For example, the receiving entity may have received a request to process data that is in a first row pool of a group of row pools. Accordingly, the receiving entity may fulfill such a request as soon as the first row pool arrives at the receiving entity without having to wait for the arrival of the remaining row pools in the group, which may reduce latency.

At block 1208, the receiving entity may retrieve data from the one or more index pools. For example, the receiving entity may run on a search query on the index data in a particular index pool to determine if certain data is stored in the row pool that corresponds to the particular index pool. Since an index pool is generally smaller in size than its corresponding row pool, performing a search query on the index pool may result in faster return of query results than a search query on the corresponding row pool. In various embodiments, the retrieval of data from the one or more row pools in the block 1208 may occur prior to or concurrently with the retrieval of data from the one or more row pools in the block 1206.

FIG. 13 is a flow diagram of the illustrative process 1300 for streaming data from a sending entity to a receiving entity using a row pool during which the receiving entity modifies the data.

At block 1302, a receiving entity may receive an existing row pool or an existing index pool for the existing row pool from a sending entity. The existing row pool may include one or more data rows that store information for a table, such as one of the tables 128, which is part of the dataset structure 126. The existing index pool may include index data for one or more rows in a corresponding row pool, such index data may include row pointers and one or more column offsets for each data row in the corresponding row pool. The data transfer component 120 may be used by the sending entity to transfer the existing row pool and the corresponding index from the sending party to the receiving party. In various embodiments, the existing index pool may be transferred before the existing row pool, or the existing row pool may be transferred before the existing index pool.

At block 1304, the receiving entity may determine that at least a portion of the existing row pool is to be modified while it is receiving the existing row pool or the existing index pool. The modification may involve operations that create, delete, or change the data in the existing row pool. In various embodiments, the receiving entity may decide to make the modification due to its processing of data or based on a request from another entity (e.g., an application). The modification may include the addition of one or more data rows to the existing row pool that is being received.

At block 1306, the data transfer component 120 may create a new row pool for the storage of data that modifies the existing row pool, e.g., one or more additional data rows, while the receiving of the existing row pool or the existing index pool is still in progress.

At block 1308, the data transfer component 120 may store the modified data in the new row pool for the receiving entity. The modified data may include the one or more additional data rows.

At block 1310, the data transfer component 120 may generate a new index pool for the new row pool. The existing index pool may include index data for one or more additional data rows in the new row pool. Subsequently, the receiving entity may further modify data in at least one data row in the rows pools and/or transfer the row pools to another entity. Further, the receiving entity may also alternatively or concurrently retrieve the index data from the corresponding index pools or transfer the index data in the corresponding index pools to another entity.

FIG. 14 is a flow diagram of the illustrative process 1400 for streaming of data from a sending entity to a receiving entity using row pools during which the sending entity modifies the data.

At block 1402, a sending entity may send an existing row pool or an existing index pool for the existing row pool from a sending entity to a receiving entity. The existing row pool may include one or more data rows that store information for a table, such as one of the tables 128, which is part of the dataset structure 126. The existing index pool may include index data for one or more rows in a corresponding row pool, such index data may include row pointers and one or more column offsets for each data row in the corresponding existing row pool. The data transfer component 120 may be used by the sending entity to transfer the existing row pool and the corresponding index from the sending party to the receiving party. In various embodiments, the existing index pool may be transferred before the existing row pool, or the existing row pool may be transferred before the existing index pool.

At block 1404, the sending entity may determine that at least a portion of the existing row pool is to be modified while it is sending the existing row pool or the existing index pool. The modification may involve operations that create, delete, or change the data in the existing row pool. In various embodiments, the sending entity may make the modification due to its processing of data or based on a request from another entity (e.g., an application). The modification may include the addition of one or more data rows to the existing row pool that is being sent.

At block 1406, the data transfer component 120 may create a new row pool for the storage of data that modifies the existing row pool, e.g., one or more additional data rows, while the sending is still in progress.

At block 1408, the data transfer component 120 may store the modified data in the new row pool for the receiving entity. The modified data may include the one or more additional data rows.

At block 1410, the data transfer component 120 may generate a new index pool for the new row pool. The new index pool may include index data for one or more additional data rows in the new row pool.

At block 1412, the data transfer component 120 may, on behalf of the sending entity, send the new index pool to the receiving entity. The transfer may be implemented in such a way that the new index pool integrates into the existing index pool that was previously sent to the receiving party.

At block 1414, the data transfer component 120 may, on behalf of the sending entity, send the new row pool to the receiving entity. The transfer may be implemented in such a way that the new row pool integrates into the existing row pool that was previously sent to the receiving party. Subsequently, the receiving entity may further modify data in at least one data row in the integrated row pool and/or transfer the integrated row pool to another entity. Further, the receiving entity may also alternatively or concurrently retrieve the index data from the corresponding integrated index pool or transfer the index data in the corresponding integrated index pool to another entity.

It will be appreciated that while the transfer of one or more row pools is described in each of the scenarios in FIGS. 12-14 as occurring prior to the transfer of the one or more corresponding index pools, the order of the transfers may be reversed in additional embodiments. In other words, the transfer of the one or more index pools may occur prior to the transfer of the one or more corresponding row pools in the additional embodiments.

Data latency may be additionally reduced by scaling the number of modules that are in the streaming pipeline of a service component. In various embodiments, a scaling component 630, as shown in FIG. 6, may monitor the performance of the modules in a streaming pipeline, such as the streaming pipeline 610, and scale the number of modules depending on the data production rates and the data consumption rates of the modules that are transferring data over a channel, such as a channel 646 between the query modules 616 and 620. The operation of the scaling component 630 is further illustrated in FIG. 15.

Figure 15:
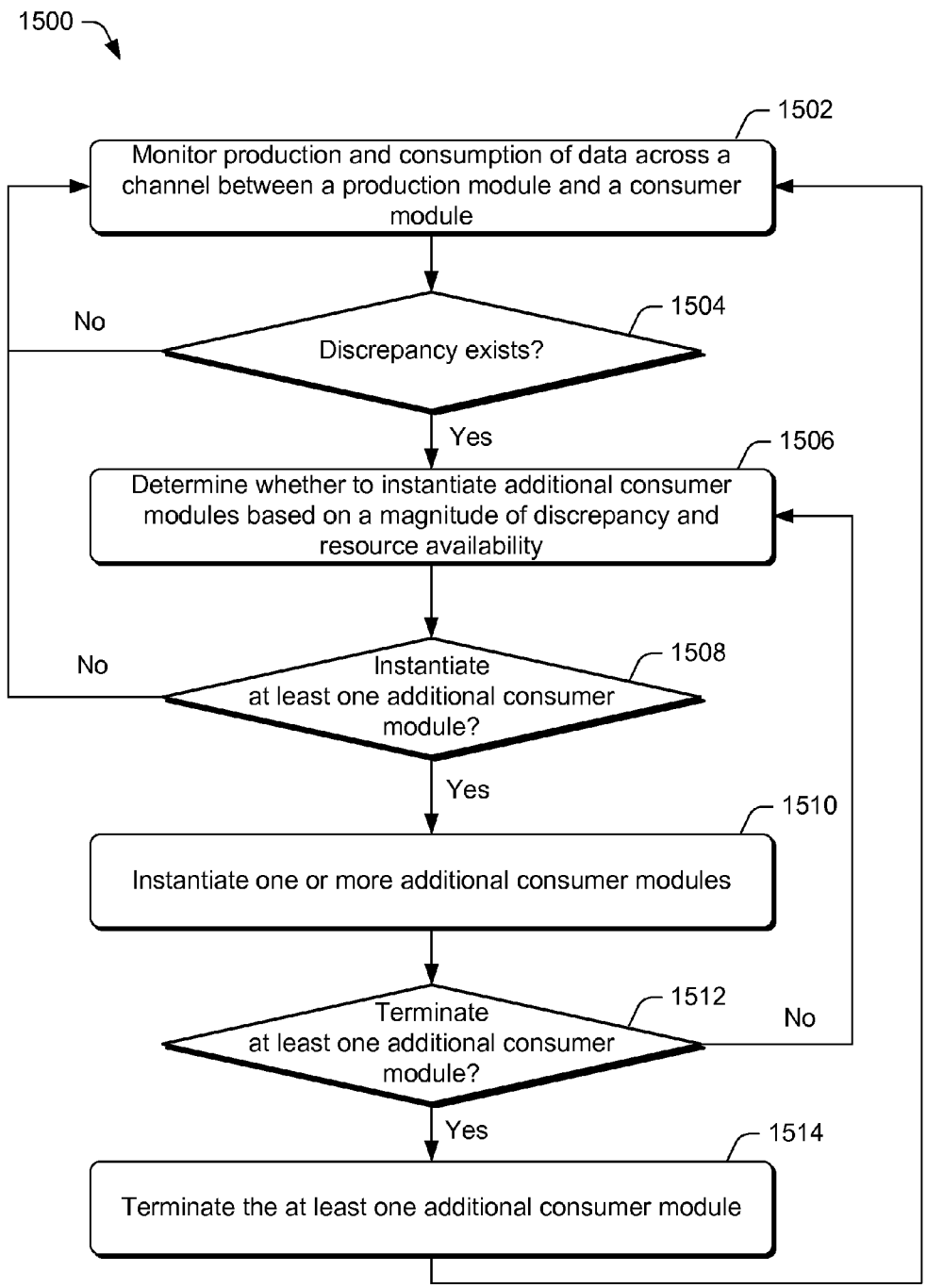
FIG. 15 is a flow diagram of an illustrative process for scaling the number of modules in a service component.

FIG. 15 is a flow diagram of an illustrative process 1500 for scaling the number of modules in a service component. The process 1500 is illustrated as a collection of blocks in a logical flow graph, which represents a sequence of operations that can be implemented in hardware, software, or a combination thereof. In the context of software, the blocks represent computer-executable instructions stored on one or more computer-readable memory that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At block 1502, the scaling component 630 may monitor the production and consumption of data across a channel by a pair of modules in a service component. For example, the scaling component 630 may monitor a rate at which the query module 616 produces processed data and a rate at which the query module 620 consumes the processed data from the query module 616.

At decision block 1504, the scaling component 630 may determine whether a discrepancy between the data production rate and the data consumption rate exists. For example, a discrepancy may exist if the data production rate is higher than the data consumption rate. If the scaling component 630 determines that no discrepancy exists ("no" at decision block 1504), the process 1500 may loop back to block 1502 so that the data production rate and the data consumption rate may be continuously monitored.

However, if the scaling component 630 determines at decision block 1504 that a discrepancy exists ("yes" at decision block 1504), the process 1500 may proceed to block 1506. At block 1506, the scaling component 630 may determine whether to instantiate additional consumer modules. For example, if the stream split module 614 is producing more data then the query module 616 is capable of processing, then the scaling component 630 may determine whether one or more additional query modules 616 are to be produced. In various embodiments, the determination may be made based on a difference between the data production rate and the data consumption rate. For example, whether the data production rate exceeds the data consumption rate by a predetermined threshold.

In some embodiments, the scaling component 630 may take into account one or more resource availability factors in addition to the difference between the two rates. These factors may include available processing power of the servers 104, available memory of the servers 104, the number of requests being processed by the servers 104, and/or other factors that affect the performance of the servers 104. For example, in some instances, no additional consumer services component modules may be instantiated despite a discrepancy because the servers 104 may lack the available resources. The amount of resources available may be impacted by the instantiation of additional consumer modules for one or more additional pairs of service component modules in the same streaming pipeline or at least one other streaming pipeline. In other words, the scaling component 630 may be simultaneously managing the instantiation of multiple consumer modules with respect to different streaming pipelines.

Further, the number of additional consumer modules may be dependent on a magnitude of the difference between data production rate and the data consumption rate (e.g., the greater the difference, the more numerous the additional consumer service components that are instantiated). Alternatively, the number of additional consumer modules may be further dependent upon an amount of resources available (e.g., processing power, memory, etc.) in combination with the magnitude of the difference between data production rate and the data consumption rate.

At decision block 1508, if the scaling component 630 determines that no additional consumer modules are to be instantiated ("no at decision block 1508), the process 1500 is to loop back to block 1502 so that the data production rate and the data consumption rate may be continuously monitored.

However, if the scaling component 630 determines that at least one additional consumer modules is to be instantiated ("yes" at decision block 1508), the process 1500 may proceed to block 1510. At block 1510, the scaling component 630 may instantiate one or more additional consumer modules based on the magnitude of the discrepancy and/or the amount of resources available on the servers 104. In various embodiments, the actual number of additional consumer modules that are instantiated by the scaling component 630 may be proportional to the magnitude of the discrepancy and/or the amount of resources available on the servers 104.

At decision block 1512, the scaling component 630 may determine whether at least one additional consumer modules is to be terminated. In various embodiments, the scaling component 630 may terminate the one or more additional consumer modules when the difference between the data production rate and the data consumption rate falls below the predetermined threshold and/or when the amount of one or more resources available (e.g., processing power and/or memory) falls below a certain designated level.

In some embodiments, the number of the additional consumer modules that are terminated may be in proportion to a change in the difference between the data production rate and the data consumption rate and/or a decrease in the amount of one or more resources that is available. For example, the scaling component 630 may terminate one additional consumer module but maintain another additional consumer module in place when the data production rate decreases from being three times the data consumption rate to being two times the data consumption rate. In another example, the scaling component 630 may terminate one additional consumer module but maintain another additional consumer module when the amount of one or more resources available falls from being able to sustain two additional consumer modules to sustain one additional consumer module.

Accordingly, if the scaling component 630 determines that no additional consumer modules are to be terminated ("no" at decision block 1512), the process 1500 may loop back to block 1506, so that the scaling component 630 may continuously determine whether to instantiate additional consumer modules.

However, if the scaling component 630 determines that at least one additional consumer modules is to be terminated ("yes" at decision block 1512), the process 1500 may proceed to block 1514. At block 1514, the scaling component 630 may terminate one or more additional consumer modules. The number of the additional consumer modules that are terminated may be in proportion to a decrease in the magnitude of the difference between the data production rate and the data consumption rate and/or a decrease in the amount of one or more resources that is available. Subsequently, the process 1500 may loop back to block 1502 so that the data production rate and the data consumption rate may be continuously monitored.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method, comprising:
    under control of one or more servers configured with executable instructions,
    storing data in a table having a plurality of rows and a plurality of columns, individual rows storing a tuple of information that conforms to an entity type defined by a schema, the schema including a corresponding column definition for individual columns;
    storing the plurality of rows in the table that have a variable row size or a fixed row size into a plurality of pages, at least one row of data in a page having the variable row size being positioned using a corresponding unique absolute offset value and at least one corresponding unique column offset value, and at least one row of data in a page having the fixed row size being positioned using a corresponding unique absolute offset value and at least one common column offset value that is identical for the plurality of rows; and
    modifying a particular row to include at least one more byte of data or at least one less byte of data;
    adjusting an absolute offset of an additional row that follows the particular row based on a change in an amount of bytes in the particular row due to modification of the particular row while maintaining a relative offset of the additional row as unchanged; and
    updating a page that includes the particular row with a page revision number that indicates that the particular row of the page is modified.

2. The computer-implemented method of claim 1, wherein the page has a unique identifier and a row in the plurality of pages has a unique identifier that is permanently associated with the row, further comprising checking the page for a specific row in response to a requested to access the specific row even after the specific row has been deleted from the page.

3. The computer-implemented method of claim 1, further comprising transferring data from a first service component to a second service component by differentially serializing and transferring one or more of the plurality of pages, the differentially serializing including serializing and transferring a first page of the plurality of pages in response to determining that the first page includes one or more modified rows of data and passing over a second page of the plurality of pages from serialization and transfer in response to determining that the second page does not include any modified rows of data.

4. A system, comprising:
    one or more processors; and
    a memory that includes a plurality of components, the components comprising:
    a dataset structure that includes a table having multiple rows and a plurality of columns, the table being defined by a schema for an entity type that includes a corresponding column definition for individual columns, and the at least one row storing a tuple of information that conforms to the entity type defined by the schema; and
    a data transfer component that transfers data stored in the dataset structure between service components and between component modules in a pipeline of a service component, the data transfer component transferring the data stored in the table through the pipeline by propagating data stored in a first row of the table to a first component module of the pipeline for processing while propagating data stored in a second row of the table to a second component module of the pipeline for processing.

5. The system of claim 4, further comprising a serializer that converts at least some of the data in the dataset structure to another format for transmission over a network, the serializer performing a full serialization that converts every portion of the data stored in the dataset structure or a differential serialization that converts a modified portion of the data stored in the dataset structure.

6. The system of claim 5, wherein the full serialization or the differential serialization generates formatted data that includes one or more bytes that designate the formatted data as organized according to the dataset structure, and wherein a first additional byte indicates a major version of a serializer and a second additional byte indicates a minor version of the serializer.

7. The system of claim 5, wherein the differential serialization converts data included in a first page of data for transmission over a network in response to determining that the first page includes at least one piece of modified information and passes over a second page of data from undergoing data conversion in response to determining that the second page does not include any piece of modified information.

8. The system of claim 4, wherein the service components process the data stored in the dataset structure for an application.

9. The system of claim 4, wherein the table includes a plurality of rows that are organized into pages, the pages having unique identifiers and individual rows in a page having a unique identifier for a corresponding page.

10. The system of claim 9, wherein the page of the pages includes a recommended size that is exceeded during an addition of data to the page.

11. The system of claim 9, wherein a row is stored on the page of the pages such that the data transfer component, in response to a request to interact with the row, checks the page for the row even after deletion of the row.

12. The system of claim 9, wherein the pages includes a fixed row size page, and wherein the data transfer component locates data from a row of multiple rows of data in the fixed row size page using a corresponding unique absolute offset value and at least one common column offset value that is identical for all of the multiple rows.

13. The system of claim 9, wherein the pages includes a variable row size page, and wherein the data transfer component locates data from a row of multiple rows of data in the variable row size page using a corresponding unique absolute offset value and at least one corresponding unique column offset value.

14. The system of claim 4, wherein a column definition for a corresponding column designate the column as including an attribute, an attribute name of the attribute, an attribute type of the attribute, or whether the attribute is a primary key.

15. The system of claim 4, wherein a query for data from one or more rows of the table is executed using custom code without use of pre-established query language.

16. The system of claim 4, wherein the dataset structure includes an additional table of the entity type that shares an identical schema as the table, the additional table having additional column definitions that are identical to the column definitions of the table.

17. The system of claim 4, wherein a column includes a value type that exists with a specific scope or as reference type that is referenced with a pointer.

18. One or more non-transitory computer readable media storing computer-executable instructions that, when executed, cause one or more processors to perform acts comprising:
inserting a replacement row for an existing row of an original page into a replacement page, the replacement row having a different byte length than the existing row;
copying a subsequent row that follows the existing row from an original page to a replacement page, the subsequent row having an absolute offset that indicates a beginning position of the subsequent row in the original page and a relative offset that indicates a beginning position of a column in the subsequent row;
providing the replacement page with an identifier of the original page;
assigning the replacement page with a value flag that indicates the replacement page includes modified data; and
adjusting the absolute offset of the subsequent row based on a byte length difference between the replacement row and the existing row while maintaining the relative offset as unchanged.

19. The one or more non-transitory computer readable media of claim 18, further comprising instructions that, when executed, cause the one or more processors to perform an act of deleting the original page.

20. The one or more non-transitory computer readable media of claim 18, further comprising instructions that, when executed, cause the one or more processors to perform an act of providing the replacement page with at least one of a revision number that indicates the replacement page is more recent than the original page.

21. The one or more non-transitory computer readable media of claim 18, wherein the absolute offset and the relative offset are stored in at least one index of the replacement page.

22. The one or more non-transitory computer readable media of claim 18, wherein the original page and the replacement page store data in a table of a dataset structure, the table being defined by a schema for an entity type, and at least one of the replacement row and the subsequent row storing a corresponding tuple of information that conforms to an entity type defined by the schema.

23. The one or more non-transitory computer readable media of claim 22, wherein the schema includes a corresponding column definition for a column in the replacement row or the subsequent row.

24. A computer-implemented method, comprising:
under control of one or more computing systems configured with executable instructions,
determining whether a data processing scenario includes use of a variable size data tuple;
storing one or more data tuples used in the data processing scenario in corresponding rows of a variable row size table in response to a determination that the data processing scenario includes the use of the at least one variable size data tuple; and
storing the one or more data tuples used in the data processing scenario in corresponding rows of a fixed row size table in response to a determination that the data processing scenario lacks the use of the at least one variable size data tuple.

25. The computer-implemented method of claim 24, wherein performing a transaction on a data tuple in the variable row size table uses more processing power than performing a transaction on a data tuple in the fixed row size table.

26. The computer-implemented method of claim 24, wherein a row of data tuple of a plurality of rows of data tuples in the variable row size table is positioned using a corresponding unique absolute offset value and at least one corresponding unique column offset value, and wherein a row of data tuple in the fixed row size table is positioned using a corresponding unique absolute offset value and at least one common column offset value that is identical for a plurality of rows of data tuples.

27. The computer-implemented method of claim 24, wherein the fixed row size table takes more bandwidth to transfer between a plurality of service components than the variable row size table.

28. The computer-implemented method of claim 24, wherein a first index that stores a corresponding absolute offset value and at least one corresponding unique column offset value for individual rows in the variable row size table is bigger in size than a second index that store the corresponding unique absolute offset value and at least one common column offset value for individual rows in the fixed row size table.

\* \* \* \* \*